(12) United States Patent
McGregor et al.

(10) Patent No.: US 7,164,138 B2
(45) Date of Patent: Jan. 16, 2007

(54) HIGH-EFFICIENCY NEUTRON DETECTORS AND METHODS OF MAKING SAME

(75) Inventors: Douglas S. McGregor, Riley, KS (US); Raymond Klann, Bolingbrook, IL (US)

(73) Assignee: The Regents of the University of Michigan, Ann Arbor, MI (US)

( * ) Notice: Subject to any disclaimer, the term of this patent is extended or adjusted under 35 U.S.C. 154(b) by 636 days.

(21) Appl. No.: 10/695,019

(22) Filed: Oct. 29, 2003

(65) Prior Publication Data

US 2005/0258372 A1 Nov. 24, 2005

Related U.S. Application Data

(60) Provisional application No. 60/422,148, filed on Oct. 29, 2002.

(51) Int. Cl.
*G01T 3/00* (2006.01)
(52) U.S. Cl. .................................. 250/390.01
(58) Field of Classification Search ........... 250/390.01, 250/390.02, 390.03, 390.04
See application file for complete search history.

(56) References Cited

U.S. PATENT DOCUMENTS

| | | | |
|---|---|---|---|
| 5,629,523 A | 5/1997 | Ngo et al. |
| RE35,908 E | 9/1998 | Kitaguchi et al. |
| 5,880,471 A | 3/1999 | Schelten et al. |
| 5,940,460 A | 8/1999 | Seidel et al. |
| 6,072,181 A | 6/2000 | Hassard et al. |
| 6,479,826 B1 | 11/2002 | Klann et al. |
| 6,545,281 B1 | 4/2003 | McGregor et al. |

OTHER PUBLICATIONS

McGregor, Douglas S., et al, Bulk GaAs-Based Neutron Detectors For Spent Fuel Analysis, Proceedings of ICONE 8, 8th Int'l Conf. on Nuclear Eng., Baltimore, MD, Apr. 2-6, 2000, pp. 1-5.

De Lurgio, Patrick M., et al., A Neutron Detector To Monitor The Intensity of Transmitted Neutrons For Small-Angle Neutron Scattering Instruments, Elsevier Science B.V., Nuclear Instruments And Methods in Physics Research A 505, 2003, pp. 46-49.

(Continued)

*Primary Examiner*—David Porta
*Assistant Examiner*—Christopher Webb
(74) *Attorney, Agent, or Firm*—Brooks Kushman P.C.

(57) ABSTRACT

Neutron detectors, advanced detector process techniques and advanced compound film designs have greatly increased neutron-detection efficiency. One embodiment of the detectors utilizes a semiconductor wafer with a matrix of spaced cavities filled with one or more types of neutron reactive material such as $^{10}$B or $^{6}$LiF. The cavities are etched into both the front and back surfaces of the device such that the cavities from one side surround the cavities from the other side. The cavities may be etched via holes or etched slots or trenches. In another embodiment, the cavities are different-sized and the smaller cavities extend into the wafer from the lower surfaces of the larger cavities. In a third embodiment, multiple layers of different neutron-responsive material are formed on one or more sides of the wafer. The new devices operate at room temperature, are compact, rugged, and reliable in design.

45 Claims, 10 Drawing Sheets

OTHER PUBLICATIONS

Klann, Raymond T., et al., Development of Semiconductor Detectors For Fast Neutron Radiography, 15th Int'l. conf. on Applications of Accelerators in Research and Industry, Nov. 2000, pp. 1-4.

Gersch, H.K., et al., The Effect of Incremental Gamma-Ray Doses and Incremental Neutron Fluences Upon The Performance of Self-Biased $^{10}$B-Coated High-Purity Epitaxial GaAs Thermal Neutron Detectors, Nuclear Instruments and Methods in Physics Research A 489, Feb. 12, 2002, pp. 85-98.

McGregor, Douglas S., et al., Thin-Film-Coated Detectors For Neutron Detectors, J. of Korean Asso. For Radiation Protection, vol. 26, 2001, pp. 167-175.

McGregor, Douglas, S., et al., Designs For Thin-Film-Coated Semiconductor Thermal Neutron Detectors, University of Michigan, Ann Arbor, Michigan, Nov. 14, 2001, pp. 1-6.

McGregor, Douglas S., et al., Recent Results From Thin-Film-Coated Semiconductor Neutron Detectors, Proceedings of SPIE, vol. 4784, 2002, pp. 164-182.

McGregor, Douglas S., et al., Semi-Insulating Bulk GaAs Thermal Neutron Imaging Arrays, IEEE Transactions on Nuclear Science, vol. 43, No. 3, Jun. 1996, pp. 1357-1364.

Rose, A., Sputtered Boron Films on Silicon Surface Barrier Detectors, Nuclear Instruments and Methods, 52, 1967, pp. 166-170.

Feigl B., et al., Der Gd-Neutronenzahler, Nuclear Instruments and Methods, 61, Wien, Austria, 1968, pp. 349-356.

Mireshghi, A., et al., High Efficiency Neutron Sensitive Amorphous Silicon Pixel Detectors, IEEE Transactions on Nuclear Science, vol. 41, No. 4, Aug. 1994, pp. 915-921.

Foulon, F., et al., Neutron Detectors Made From Chemically Vapour Deposited Semiconductors, Proc. MRS, 487, 1998, pp. 591-596.

Dulloo, A.R., et al., Radiation Response Testing of Silicon Carbide Semiconductor Neutron Detectors For Monitoring Thermal Neutron Flux, Report 97-9TK1-NUSIC-R1, Westinghouse STC, Pitsburg, PA, Nov. 18, 1997, pp. 6-1-6-14.

Knoll, Glenn F., Radiation Detection and Measurement, 3rd Ed. John Wiley & Sons, Inc., New York, 2000, Chapter 14, pp. 505-508.

Garber, D.I., et al., Neutron Cross Sections, 3rd Edition, vol. 11, Curves, Brookhaven National Laboratory, Upton, Jan. 1976, pp. 11-13 & pp. 23-24.

McLane, Victoria, et al., Neutron Cross Sections, vol. 2, Neutron Cross Section Curves, Academic Press, San Diego, CA, 1988, pp. 12-13 & pp. 26-27.

McGregor, Douglas, S., et al., Thin-Film-Coated Bulk GaAs Detectors for Thermal and Fast Neutron Measurements, Nuclear Instruments and Methods in Physics Research A 466, 2001, pp. 126-141.

McGreggor, Douglas, S., et al., Design Considerations for Thin Film Coated Semiconductor Thermal Neutron Detectors—I: Basics Regarding Alpha Particle Emitting Neutron Reactive Films, Nuclear Instruments & Methods, A 500, 2003, pp. 272-308.

Puckett, P.R., et al., Thin Film Processes II, Chapter V-2, J.L. Vossen and W. Kern, Eds., Academic Press, Boston, 1991, pp. 749.

Sze, S.M., VLSI Technology, McGraw-Hill, New York, 1983.

Ruska, W.S., Microelectronic Processing, McGraw-Hill, New York, 1987.

Wolf, Stanley, et al., Silicon Processing for the VLSI Era, Lattice Press, Sunset Beach, 1986.

McGregor, Douglas, S., et al., Self-Biased Boron-10 Coated High-Purity Epitaxial GaAs Thermal Neutron Detectors, IEEE Transactions on Nuclear Science, vol. 47, No. 4, Aug. 2000, pp. 1364-1370.

Klann Raymond T., et al., Development of Coated Gallium Arsenide Neutron Detectors, Conference Record of ICONE-8, 8TH International Conf. on Nuclear Eng., Apr. 2-6, 2000, Baltimore, MD, pp. 1-6.

McGregor, Douglas, S., et al., New Surface Morphology for Low Stress Thin-Film-Coated Thermal Neutron Detectors, IEE Transactions on Nuclear Science, vol. 49, No. 4, Aug. 2002, pp. 1999-2004.

Schelten, J., et al., A New Neutron Detector Development Based on Silicon Semiconductor and LiF Converter, Physica B 234-236, 1997, pp. 1084-1086.

Atomnaya Energiya, Soviet Atomic energy, Russian Original, vol. 62, No. 4, Apr. 1987, pp. 316-319.

Allier C.P., Micromachined Si-Well Scintillator Pixel Detectors, Chapter 8, 2001, pp. 122-134.

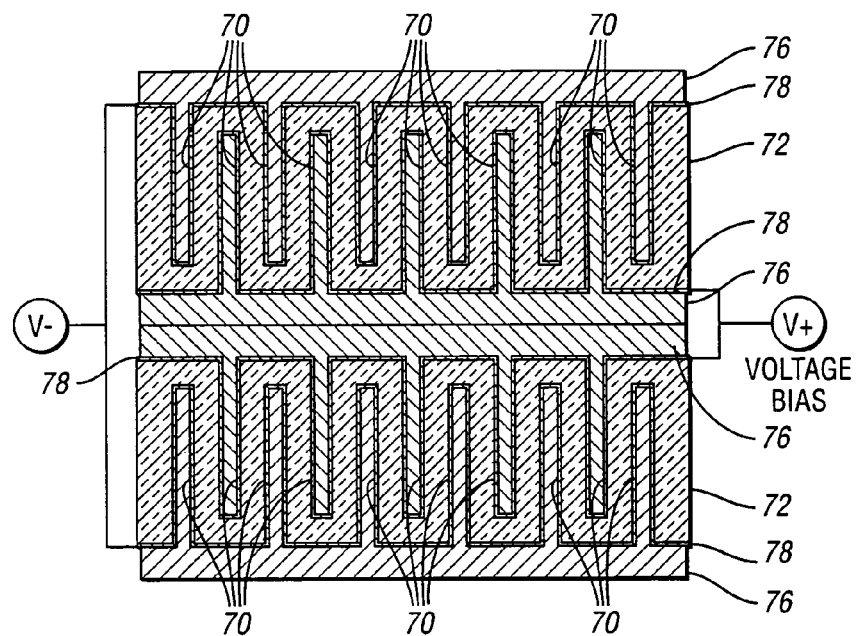
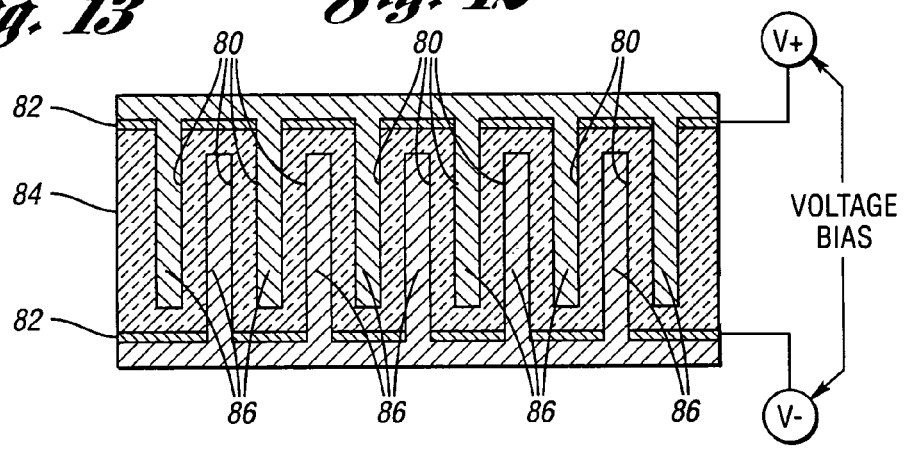
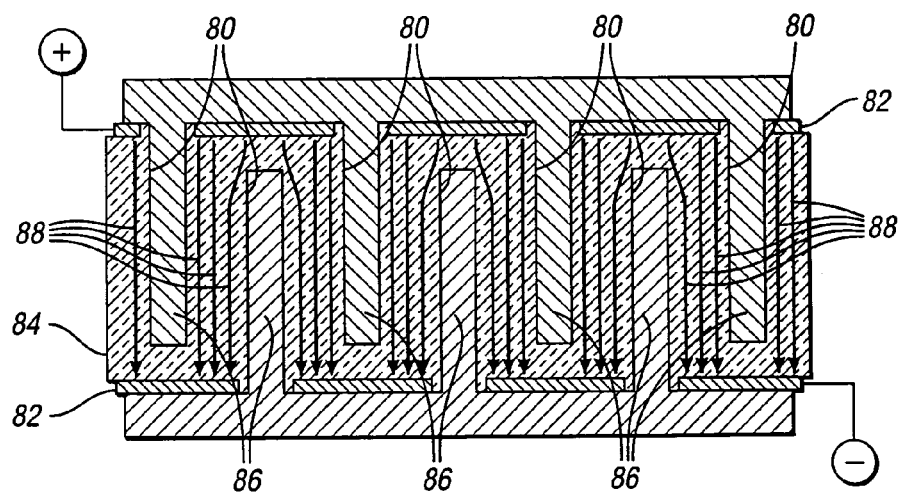
Fig. 13   Fig. 12
Fig. 14

HIGH-EFFICIENCY NEUTRON DETECTORS AND METHODS OF MAKING SAME

CROSS-REFERENCE TO RELATED APPLICATION

This application claims the benefit of U.S. provisional application Ser. No. 60/422,148, filed Oct. 29, 2002 and entitled "High Efficiency Neutron Detectors."

STATEMENT REGARDING FEDERALLY SPONSORED RESEARCH OR DEVELOPMENT

This invention was made with Government support under Contract No. W-31-109-ENG-38 from the U.S. Department of Energy (DOE). The Government has certain rights in this invention.

BACKGROUND OF THE INVENTION

1. Field of the Invention

This invention relates to neutron detectors, methods of making same, and in particular, to high-efficiency neutron detectors and methods of making same.

2. Background Art

Semiconductor detectors coated with neutron reactive materials offer an alternative approach to scintillator-based neutron imaging devices for neutron radiography (normally scintillating screens coupled to photographic film or to other photorecording devices). The detectors also offer an alternative to He-3 proportional counters, BF3 proportional counters, Li-loaded glasses, and other scintillator-based systems for neutron detection. Neutron reactive film-coated devices investigated in previous works include Si, SiC, GaAs, and diamond detectors, all of which have advantages and disadvantages as described in references 1–6 noted at the end of this section.

The converter films attached to semiconductor devices most often used for neutron-detection utilize either the $^6$Li(n,$\alpha$)$^3$H reaction or the $^{10}$B(n,$\alpha$)$^7$Li reaction. Due to low chemical reactivity, the most common materials used are pure $^{10}$B and $^6$LiF. Neutron reactive films based on the $^{157}$Gd(n,$\gamma$)$^{158}$Gd reaction show a higher neutron absorption efficiency than $^{10}$B(n,$\alpha$)$^7$Li and $^6$Li(n,$\alpha$)$^3$H-based films, however the combined emission of low energy gamma rays and conversion electrons from $^{157}$Gd(n,$\gamma$)$^{158}$Gd reactions make neutron-induced events difficult to discriminate from background gamma-ray events. As a result, Gd-based films are less attractive for devices where background gamma ray contamination is a problem. Alternatively, the particle energies emitted from the $^6$Li(n,$\alpha$)$^3$H and the $^{10}$B(n,$\alpha$)$^7$Li reactions are relatively large and produce signals easily discernable from background gamma ray noise. Thus far, thermal neutron-detection efficiencies have been limited to only 4% for $^6$LiF and $^{10}$B single-coated devices.

Expected Efficiency of Conventional $^{10}$B and $^6$Li Coated Detectors

The $^{10}$B(n,$\alpha$)$^7$Li reaction leads to the following reaction products, as described in reference 7 noted at the end of this section:

| | Reaction Q-Value |
|---|---|
| $\begin{cases} ^7Li(\text{at } 1.015 \text{ MeV}) + \alpha(\text{at } 1.777 \text{ MeV}), \\ ^7Li^*(\text{at } 0.840 \text{ MeV}) + \alpha(\text{at } 1.470 \text{ MeV}), \end{cases}$ | 2.792 MeV(to ground state) 2.310 MeV(1st excited state) | which are released in opposite directions when thermal neutrons (0.0259 eV) are absorbed by $^{10}$B. After absorption, 94% of the reactions leave the $^7$Li ion in its first excited state, which rapidly de-excites to the ground state (~$10^{-13}$ seconds) by releasing a 480 keV gamma ray. The remaining 6% of the reactions result in the $^7$Li ion dropping directly to its ground state. The microscopic thermal neutron absorption cross section is 3840 barns. Additionally, the microscopic thermal neutron absorption cross section decreases with increasing neutron energy, with a dependence proportional to the inverse of the neutron velocity (1/v) over much of the energy range, as described in references 8 and 9.

The $^6$Li(n,$\alpha$)$^3$H reaction leads to the following products:

| | Reaction Q-Value |
|---|---|
| $^6Li + {}_0^1n \rightarrow {}^3H(\text{at } 2.73 \text{ MeV}) + \alpha(\text{at } 2.05 \text{ MeV}),$ | 4.78 MeV | which again are oppositely directed if the neutron energy is sufficiently small. The microscopic thermal neutron (0.0259 eV) absorption cross section is 940 barns. The thermal neutron absorption cross section also demonstrates a 1/v dependence, except at a salient resonance above 100 keV, in which the absorption cross section surpasses that of $^{10}$B for energies between approximately 150 keV to 300 keV, as described in references 8 and 9. Additional resonances characteristic to either isotope cause the absorption cross section to surpass one or the other as the neutron energy increases. Due to its higher absorption cross section, the $^{10}$B(n,$\alpha$)$^7$Li reaction leads to a generally higher reaction probability than the $^6$Li(n,$\alpha$)$^3$H reaction for neutron energies below 100 keV. However, the higher energy reaction products emitted from the $^6$Li(n,$\alpha$)$^3$H reaction lead to greater ease of detection than the particles emitted from the $^{10}$B(n,$\alpha$)$^7$Li reaction.

The term "effective range" (denoted L) is the distance through which a particle may travel within the neutron reactive film before its energy decreases below the set minimum detectable threshold, or rather, before its energy decreases below the electronic lower level discriminator (LLD) setting. The term does not take into account additional energy losses from contact "dead regions." The neutron reaction products released do not have equal masses, and therefore do not have equal energies or effective ranges. Neutrons may interact anywhere within the reactive film, and the reaction products lose energy as they move through the neutron reactive film. Reaction product self-absorption reduces the energy transferred to the semiconductor detector, and ultimately limits the maximum film thickness that can be deposited over the semiconductor device. The measured voltage signal is directly proportional to the number of electron-hole pairs excited within the semiconductor. Reaction products that deposit most or all of their energy in the detector will produce much larger voltage signals than those reaction products that lose most of their energy before reaching the detector.

The energy absorbed in the detector is simply the original particle energy minus the combined energy lost in the boron film and the detector contact during transit. At any reaction location within the reactive film, a reduced energy will be retained by either particle that should enter the detector, being the maximum possible if the trajectory is orthogonal to the device contact. Hence, if the interaction occurs in the $^{10}$B film at a distance of 0.5 μm away from the detector, the maximum energy retained by the $^{7}$Li ion when it enters the detector will be 430 keV, and the maximum energy retained by the alpha particle will be 1250 keV, as described in references 10 and 11. For the same interaction distance of 0.5 μm from the detector, the energy retained by the particle when it reaches the detector decreases as the angle increases from orthogonal (>0°). Given a predetermined minimum detection threshold (or LLD setting), the effective range (L) for either particle can be determined. For instance, an LLD setting of 300 keV yields $L_{Li}$ as 0.810 microns and $L_\alpha$ as 2.648 microns, as described in references 10 and 11. Similar conditions exist for $^{6}$LiF and $^{6}$Li films.

A commonly used geometry involves the use of a planar semiconductor detector, generally indicated at 10, over which a neutron reactive film 11 has been deposited, as shown in FIG. 1. Upon a surface of the semiconductor detector is attached a coating that releases ionizing radiation reaction products 12 upon the interaction with a neutron 13. The ionizing radiation reaction products 12 can then enter into the semiconductor material 14 of the detector 10, thereby creating a charge cloud 15 of electrons and "holes," which can be sensed to indicate the occurrence of a neutron interaction within the neutron sensitive film. The charges 15 are swept through the detector through the application of a voltage, which is applied through the use of conductive contacts 16 and 17 upon the surfaces of the semiconductor detector, where the surfaces are generally parallel to each other.

Assuming that the neutron beam is perpendicular to the detector front contact 16, the sensitivity contribution for a reaction product species can be found by integrating the product of the neutron interaction probability and the fractional solid angle, defined by the reaction product effective ranges subtending the device interface, as described in references 10 and 11, which yields:

$$S_p(D_F) = 0.5 F_p \left\{ \left(1 + \frac{1}{\Sigma_F L}\right)(1 - e^{-\Sigma_F D_F}) - \frac{D_F}{L} \right\} \quad (1a)$$

for $D_F \leq L$, and $$S_p(D_F) = 0.5 F_p e^{-\Sigma_F (D_F - L)} \left\{ \left(1 + \frac{1}{\Sigma_F L}\right)(1 - e^{-\Sigma_F L}) - 1 \right\} \quad (1b)$$

for $D_F > L$, where $\Sigma_F$ is the macroscopic neutron absorption cross section, $D_F$ is the film thickness, and $F_p$ is the branching ratio of the reaction product emissions. The total sensitivity accordingly can be found by adding all of the reaction product sensitivities:

$$S(D_F)|_{Total} = \sum_{p=1}^{N} S_p(D_F), \quad (2)$$

where N is the number of different reaction product emissions. In the case of $^{10}$B-based films, N equals 4. Notice from equation 1b that the value of $S_P$ reduces as $D_F$ becomes larger than the value of L. As a result of this, there will be an optimum neutron reactive film thickness for front-irradiated detectors. Since the minimum particle detection threshold determines the effective range (L), the optimum film thickness is also a function of the LLD setting. For example, with the LLD set at 300 keV, the maximum achievable thermal neutron-detection efficiency is 3.95%. The thermal neutron-detection efficiency can be increased to 4.8% by lowering the LLD setting, but only at the expense of accepting more system noise and gamma-ray background interference, as described in references 1, 10 and 11. Similar cases exist for $^{6}$LiF and pure $^{6}$Li films. Using an LLD setting of 300 keV, obverse detector irradiation yields maximum thermal neutron-detection efficiencies of 4.3% for $^{6}$LiF-coated devices and 11.6% for pure $^{6}$Li-coated devices.

Increasing the efficiency can be achieved by intimately attaching two coated devices such that they are facing each other, as shown in FIG. 2. Between the two semiconductor detectors is placed a coating 20 that releases ionizing radiation reaction products 21 upon the interaction with a neutron 22. The ionizing radiation reaction products 21 can then enter into the semiconductor material 23 of either or both detectors, thereby creating a charge cloud 24 of electrons and "holes," which can be sensed to indicate the occurrence of a neutron interaction within the neutron sensitive film 20. The charges are swept through the detector through the application of a voltage, much like the case shown in FIG. 1, which is applied through the use of conductive contacts 25 upon the surfaces of the semiconductor detector, where the surfaces are generally parallel to each other.

The design does not rely on the full depletion of the detectors and can be operated with modest operating voltages. The most straightforward method for producing such a device is to simply fasten two front-coated devices together. If the neutron reaction film thickness is thin, coincident charged particle emissions from a single neutron absorption event can be measured simultaneously by both detectors if operated individually, thus giving rise to the erroneous recording of two neutron interaction events when only one actually occurred. Erroneous "double counts" can be eliminated by connecting both devices to a single preamplifier, in which a single event always registers as only one count on the preamplifier circuit. Thermal neutron-detection efficiencies of 24% can be reached for pure $^{6}$Li-coated sandwich devices.

Morphological Improvements for Improved Efficiency

Neutron-detection efficiency is limited for single coated devices since charged particle reaction products have limited ranges in the neutron reactive thin film. The detector design of FIG. 3 and U.S. Pat. No. 6,545,281 addresses two methods to improve neutron-detection efficiency, both using morphological alterations: (1) to increase the overall surface area of the device, and (2) to increase the statistical probability that the charged particle reaction product will enter the detector sensitive region.

Tiny holes (only one of which is shown in FIG. 3 at 30) may be etched into the top substrate surface, as described in U.S. Pat. No. 6,545,281, using reactive etching techniques, a method that allows for very precise and accurate control of miniature dimensions, as also described in reference 12. Holes etched into the top surface of a material are filled with the neutron reactive material 32, which serves to increase the probability that charged particle reaction products will enter the active region of the detector 34.

From the previous discussion, the maximum probability that a single charge particle product can enter the detector active region is 50%, which corresponds to neutron absorption events that occur at the $^{10}$B film/detector interface. By etching a trench into the substrate, the charged particle entrance probability is increased for absorption events that occur in the trench region. Hence, by simply etching trenches into the substrate material before administering the metal contacts 36 and the neutron-sensitive films, the overall detection efficiency of the device can be increased. Yet, charged particle reaction products can still be emitted in trajectories parallel or nearly parallel to the trenches, thereby never coming into contact with the active semiconductor detector 34. The difficulty is resolved by making the trenches circular in shape, or rather, tiny holes that are etched into the device surface. Holes etched into the surface of a material can be filled with the neutron reactive material, which serves to increase the probability that charged particle reaction products will enter the active region of the detector.

Tiny holes can be precisely etched into semiconductors with very high aspect ratios (exceeding 10:1) with various dry etching techniques such as reactive ion etching (RIE), as described in reference 12. The processes use precision photolithography and VLSI thin film techniques, hence the placement of tiny holes is straightforward. Preliminary calculations indicate that the tiny hole diameters should be on the order of the total added charged particle range. The hole sizes are theoretically optimized by making their working diameters exactly the same total effective length L for both charged particle reaction products. Using $^{10}$B as an example, the hole diameters should be approximately $$D = L_{Li} + L_\alpha,$$

such that no matter what lateral direction that the charged particles are emitted, one or the other particle will enter the detector. For instance, the value of $L_{Li}+L_\alpha=3.458$ microns in pure $^{10}$B, hence the optimized hole diameters should be approximately 3.5 microns for $^{10}$B coated devices. It follows that the hole diameters should be approximately 30 microns for $^6$LiF films and 100 microns for $^6$Li films. Etching tiny holes with depths up to 12 microns can be done simply for hole diameters of only 3.5 microns, an aspect ratio of less than 3.5:1. The vertical direction can be optimized from equations 1a and 1b. Still, charged particles can escape detection under some circumstances, but, as depicted in FIG. 3, the probability of one or the other charged particle reaction product entering the detector is tremendously increased. The entire upper surface may be processed such that an optimized matrix of holes covers the entire device upper surface, as shown in U.S. Pat. No. 6,545,281.

The actual contact on the semiconductor devices can be produced by various means, including implantation as described in reference 13, epitaxial growth as described in references 14 and 15, and evaporation or sputtering as described in references 13–15. All of these methods have been explored and developed. The contacts can be made with the low voltage self-biased design, as described in reference 16, or the highly radiation hard Schottky barrier design, as described in references 1 and 17.

REFERENCES

1. D. S. McGregor et al., "Semi-insulating Bulk GaAs Thermal Neutron Imaging Arrays," IEEE TRANS. NUCL. SCI., NS-43 (1996), p. 1357.

2. A. Rose, "Sputtered Boron Films on Silicon Surface Barrier Detectors," NUCL. INSTR. AND METH., 52 (1967), p. 166.

3. B. Feigl et al., "Der Gd-Neutronenzähler," NUCL. INSTRL. AND METH., 61 (1968), p. 349.

4. A. Mireshghi et al., "High Efficiency Neutron Sensitive Amorphous Silicon Pixel Detectors," IEEE TRANS. NUCL. SCI., NS-41 (1994), p. 915.

5. F. Foulon et al., "Neutron Detectors Made from Chemically Vapour Deposited Semiconductors," PROC. MRS, 487 (1998), p. 591.

6. A. R. Dulloo et al., "Radiation Response Testing of Silicon Carbide Semiconductor Neutron Detectors for Monitoring Thermal Neutron Flux," REPORT 97-9TK1-NUSIC-R1, Westinghouse STC, Pittsburgh, Pa. (Nov. 18, 1997).

7. G. F. Knoll, "Radiation Detection and Measurement," 3rd Ed. (Wiley, New York, 2000).

8. D. I. Garber et al., "BNL 325: Neutron Cross Sections," 3rd Ed., Vol. 2, Curves (Brookhaven National Laboratory, Upton, 1976).

9. V. McLane et al., "Neutron Cross Sections," Vol. 2, (Academic Press, San Diego, 1988).

10. D. S. McGregor et al., "Thin-Film-Coated Bulk GaAs Detectors for Thermal and Fast Neutron Measurements," NUCLEAR INSTRUMENTS AND METHODS, A466 (2001), pp. 126–141.

11. D. S. McGregor et al., "Design Considerations for Thin Film Coated Semiconductor Thermal Neutron Detectors; Part I: Basics Regarding Alpha Particle Emitting Neutron Reactive Films," NUCL. INSTRUM. AND METH., A 500 (2003), pp. 272–308.

12. P. R. Puckett et al., "Thin Film Processes II," Chapter V-2, J. L. Vossen and W. Kern, Eds., (Academic Press, Boston, 1991), p. 749.

13. S. M. Sze, "VLSI Technology," (McGraw-Hill, New York, 1983).

14. W. S. Ruska, "Microelectronic Processing," (McGraw-Hill, New York, 1987).

15. S. Wolf et al., "Silicon Processing for the VLSI Era," (Lattice Press, Sunset Beach, 1986).

16. D. S. McGregor et al., "Self-Biased Boron-10 Coated High Purity Epitaxial GaAs Thermal Neutron Detectors," IEEE TRANS. NUCLEAR SCIENCE, 47 (2000), pp. 1364–1370.

17. R. T. Klann et al., "Development of Coated GaAs Neutron Detectors," CONFERENCE RECORD OF ICONE-8, 8th International Conference on Nuclear Engineering, Apr. 2–6, 2000, Baltimore, Md. USA.

18. D. S. McGregor et al., "New Surface Morphology for Low Stress Thin-Film-Coated Thermal Neutron Detectors," IEEE TRANS. NUCLEAR SCIENCE, 49 (2002), pp. 1999–2004.

19. See the MEMS Exchange website at:
http://www.mems-exchange.org/.

20. See the NIST website for the specifications on the inductively coupled plasma reference cell at:
http://physics.nist.gov/MajResProj/rfcell/drawings.html.

SUMMARY OF THE INVENTION

An object of the present invention is to provide neutron detectors that have detection efficiencies many times greater than present neutron detectors while remaining relatively thin, compact and rugged. The detectors detect neutrons of any energy including thermal neutrons.

Another object is to provide improved methods of making such neutron detectors.

In carrying out the above objects and other objects of the present invention, an apparatus for efficiently detecting neutrons is provided. The apparatus includes a particle-detecting first substrate having first and second surfaces spaced apart by a region of the substrate and a plurality of cavities extending into the substrate from the first and second surfaces. Neutron-responsive material is disposed in the plurality of cavities. The material is responsive to neutrons absorbed thereby for releasing ionizing radiation reaction products. The neutron-responsive material disposed in the cavities at the first and second surfaces increases neutron-detection efficiency by increasing the likelihood that the reaction products will be directed into the substrate for increased neutron-detection efficiency.

The apparatus may further include a first contact layer disposed on the first surface, and a second contact layer disposed on the second surface.

The first and second contact layers may be disposed in the plurality of cavities.

The plurality of cavities may include etched via holes, trenches or other types of cavities.

The neutron-responsive material may be disposed as at least one layer on the first and second surfaces.

The neutron-responsive material disposed in the cavities at the first surface may be of a first type different from a second type of neutron-responsive material disposed in the cavities at the second surface.

The neutrons may be thermal neutrons.

The cavities extending into the substrate from one of the surfaces may be surrounded by cavities extending into the substrate from the other of the surfaces.

The first substrate may be composed primarily of a semiconductor material.

The semiconductor material may be silicon, silicon carbide, gallium arsenide, gallium nitride, indium phosphide, cadmium telluride, cadmium-zinc-telluride, gallium phosphide, mercuric iodide, or lead iodide.

The apparatus may further include a particle-detecting second substrate having neutron-responsive material disposed in cavities of the second substrate and stacked on the first substrate.

The neutron-responsive material may be disposed as layers between the substrates.

Different types of neutron-responsive material may be disposed in each of the plurality of cavities.

The neutron-responsive material may be disposed as a plurality of layers of different types of neutron-responsive material on both the first and second surfaces.

Further in carrying out the above objects and other objects of the present invention, an apparatus for efficiently detecting neutrons is provided. The apparatus includes a particle-detecting first substrate having first and second surfaces spaced apart by a region of the substrate. A first contact layer is disposed on the first surface of the substrate. A second contact layer is disposed on the second surface of the substrate. A first stack of neutron-responsive layers includes a first layer of neutron-responsive material of a first type disposed on the first contact layer and a second layer of neutron-responsive material of a second type different from the first type disposed on the first layer. Both of the materials are responsive to neutrons absorbed thereby for releasing ionizing radiation reactive products.

The first layer may have a higher neutron interaction cross section than the second layer.

The first and second types of material may include elemental or compound forms of lithium, lithium fluoride, boron, gadolinium, cadmium, $U^{235}$, Pu and Th. However, it is to be understood that any coating that produces a charged particle, light or photon will work as a coating as long as the product interacts with the substrate.

The first substrate may be composed primarily of a semiconductor material.

The semiconductor material may be silicon, silicon carbide, gallium arsenide, indium phosphide, cadmium telluride, cadmium-zinc-telluride, gallium phosphide, mercuric iodide, or lead iodide.

The apparatus may further include a particle-detecting second substrate having at least one neutron-responsive layer disposed on a contact layer of the second substrate and stacked on the first substrate.

The layers of neutron-responsive material may be disposed between the substrates.

The apparatus may further include a stack of neutron-responsive layers disposed on the second contact layer.

Still further in carrying out the above objects and other objects of the present invention, an apparatus for efficiently detecting neutrons is provided. The apparatus includes a particle-detecting first substrate having spaced first and second surfaces and a plurality of different-sized cavities extending into the substrate from the first and second surfaces. Neutron- responsive material is disposed in the plurality of different-sized cavities. The material is responsive to neutrons absorbed thereby for releasing ionizing radiation reaction products. The neutron-responsive material disposed in the different-sized cavities at the first and second surfaces increases neutron-detection efficiency by increasing the likelihood that the reaction products will be directed into the substrate for increased neutron-detection efficiency.

The apparatus may further include a first contact layer disposed on the first and second surfaces, and a second contact layer disposed on a third surface of the substrate spaced apart from the first and second surfaces by a region of the substrate.

The first contact layer may be disposed in the plurality of cavities.

The plurality of cavities may include etched large and small via holes, large and small trenches or other types of large and small cavities.

The neutron-responsive material may be disposed as a layer on the first and second surfaces.

The neutron-responsive material disposed in the cavities at the first surface may be of a first type different from a second type of neutron-responsive material disposed in the cavities at the second surface.

The neutrons may be thermal neutrons.

The holes may be generally circular in cross section.

The neutron-responsive material may be elemental or compound forms of lithium, lithium fluoride, boron, gadolinium, cadmium, any form of plastic, $U^{235}$, Pu or Th.

The first substrate may be composed primarily of a semiconductor material.

The semiconductor material may be silicon, silicon carbide, gallium arsenide, gallium nitride, indium phosphide, cadmium telluride, cadmium-zinc-telluride, gallium phosphide, mercuric iodide, or lead iodide.

Relatively small cavities may extend into the first substrate from one of the surfaces and may be disposed within relatively large cavities extending into the first substrate from the other surface.

The apparatus may further include a particle-detecting second substrate having neutron-responsive material disposed in a plurality of different-sized cavities in the second substrate and stacked on the first substrate.

The neutron-responsive material may be disposed as layers between the substrates.

At least two of the layers may be of different neutron-responsive material.

Yet still further in carrying out the above object and other objects of the present invention, an apparatus for efficiently detecting neutrons is provided. The apparatus includes a particle-detecting first substrate having first and second surfaces spaced apart by a first region of the first substrate and a first set of cavities extending into the first substrate from the first surface. A particle-detecting second substrate is stacked on the first substrate and has first and second surfaces spaced apart by a second region of the second substrate and a second set of cavities extends into the second substrate from the first surface of the second substrate. The apparatus further includes neutron-responsive material disposed in the first and second sets of cavities and on the first surfaces of the substrates. The material is responsive to neutrons absorbed thereby for releasing ionizing radiation reaction products. The neutron-responsive material disposed in the first and second sets of cavities increases neutron-detection efficiency by increasing the likelihood that the reaction products will be directed into the first and second substrates, respectively, for increased neutron-detection efficiency.

The first and second sets of cavities may not be aligned to further optimize neutron absorption.

The apparatus may further include a first contact layer disposed on the second surface of the first substrate and a second contact layer disposed on the second surface of the second substrate.

Yet still further in carrying out the above object and other objects of the present invention, a method of making a high-efficiency neutron detector is provided. The method includes providing a particle-detecting substrate having a first surface and a plurality of cavities extending into the substrate from the first surface. The plurality of cavities is filled with a neutron-responsive material. The method further includes forming a thick film of the neutron-responsive material over the first surface including the plurality of cavities wherein the cavities relieve stress in the thick film to prevent delamination of the thick film from the first surface. The material is responsive to neutrons absorbed thereby for releasing ionizing radiation reaction products. The neutron-responsive material disposed in the cavities at the first surface increases neutron-detection efficiency by increasing the likelihood that the reaction products will be directed into the substrate for increased neutron-detection efficiency.

The thick film may exceed one micron in thickness.

Further in carrying out the above object and other objects of the present invention, a method of making a high-efficiency neutron detector is provided. The method includes providing a particle-detecting first substrate having a first surface and a plurality of cavities extending into the substrate from the first surface, and filling the plurality of cavities with a neutron-responsive material. The material is responsive to neutrons absorbed thereby for releasing ionizing radiation reaction products. The neutron-responsive material disposed in the cavities at the first surface increases neutron-detection efficiency by increasing the likelihood that the reaction products will be directed into the substrate for increased neutron-detection efficiency. The step of filling includes the step of spreading the material on the first surface and vibrating the material into the plurality of cavities.

The material may be submicron powder.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 11b is an enlarged view of a circled portion of FIG. 11a;

FIG. 12 is a side, sectional, schematic view illustrating a compound detector design composed of two double-sided porous design detectors fastened in a sandwich configuration;

FIG. 13 is a side sectional view of an alternative double-sided porous design showing another possible electrode configuration;

FIG. 14 is a side sectional view of the alternative double-sided porous design from FIG. 13 showing the direction of the electric field lines; a blocking contact is applied as an anode such that the diode interface forms only at the top plane of the substrate; an applied bias causes the field lines to run parallel to the holes, thereby decreasing the capacitance while retaining the high-efficiency of the unique porous design;

DETAILED DESCRIPTION OF THE PREFERRED EMBODIMENTS

Multi-Layered Films for Improved Efficiency

Figure 4:
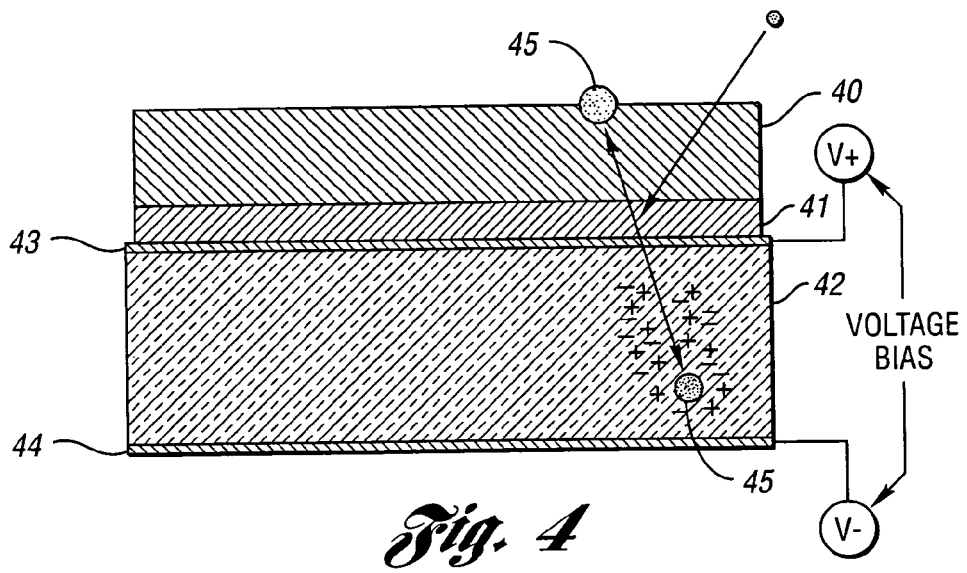
FIG. 4 is a side, sectional, schematic view of a stacked film semiconductor neutron detector of the present invention; the device incorporates multiple neutron sensitive films in order to increase the device sensitivity to neutrons of various energies; the films may consist of, but are not restricted to, boron, lithium, lithium fluoride, gadolinium and cadmium.

Referring now to FIG. 4, an embodiment of the invention is shown in which the simplistic prior art approach for the coating of a detector has been modified to incorporate multiple films 40 and 41. The neutron reactive films 40 and 41 may include, but are not limited to, various compounds and concentrations of boron, lithium, lithium fluoride, gadolinium and cadmium. Fissionable materials such as, but not limited to $U^{235}$, Pu, Th are also applicable. The device can have two or more different neutron reactive films 40 and 41 placed upon the detector surface. The semiconductor material 42 may be composed of a variety of materials, including, but not limited to, silicon, silicon carbide, gallium arsenide, gallium nitride, indium phosphide, cadmium telluride, cadmium-zinc-telluride, gallium phosphide, mercuric iodide, lead iodide, and variations of these aforementioned semiconductors. The detector has conductive contacts 43 and 44, one contact 43 placed upon a first semiconductor surface and another contact 44 placed upon a second semiconductor surface of the same semiconductor material 42 block, the second surface being generally parallel to the first surface. A voltage can be applied across the semiconductor block by means of the conductive contacts 43 and 44.

In particular, the device of FIG. 4 incorporates a double-layered film, such as with $^6$LiF on $^{10}$B or $^6$Li on $^{10}$B. The $^{10}$B(n,α)$^7$Li reaction products 45 have shorter ranges within $^{10}$B material than do $^6$Li(n,α)$^3$H reaction products. Hence, it is possible to attach a coating of $^{10}$B followed by a coating of either $^6$LiF or $^6$Li. The charged particle reaction products emanating from $^{10}$B(n,α)$^7$Li reactions can reach the detector as before since the film is applied directly to the detector contact 43. In addition, the longer range charged particle products emanating from $^6$Li(n,α)$^3$H reactions can still reach the detector even though they must transit the $^{10}$B film as well. Since the $^{10}$B film has a higher neutron interaction cross section than $^6$LiF or $^6$Li films, a net gain is realized. Hence, the short product range and high cross section material 41 is deposited closest to the contact 43 while the longest range and lowest cross section material 40 is placed atop the first film 41. The opposite case renders no improvement, and in fact actually decreases efficiency. Overall, a $^6$LiF/$^{10}$B system yields a maximum efficiency of 6.9% and a $^6$Li/$^{10}$B system yields a maximum efficiency of 12.9%.

Figure 1:
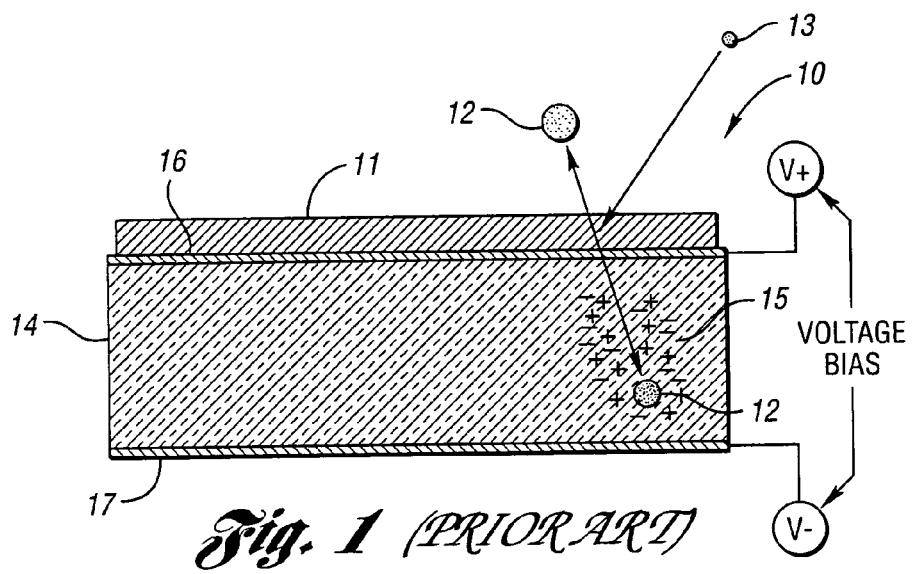
FIG. 1 is a side, sectional, schematic view showing the basic construction of a coated semiconductor neutron detector from the prior art; neutrons interact in the coating, thereby releasing detectable charged particles; for $^{10}B$ and $^{6}Li$-based films, only one particle from the interaction can enter the detector.
Figure 2:
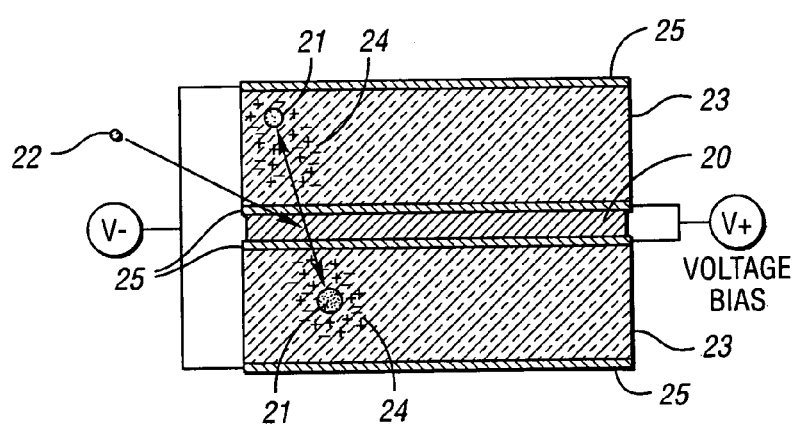
FIG. 2 is a side, sectional, schematic view showing a double-inward facing "sandwich" design of the prior art; a single neutron sensitive film is placed between the active regions of two semiconductor diode detectors.
Figure 3:
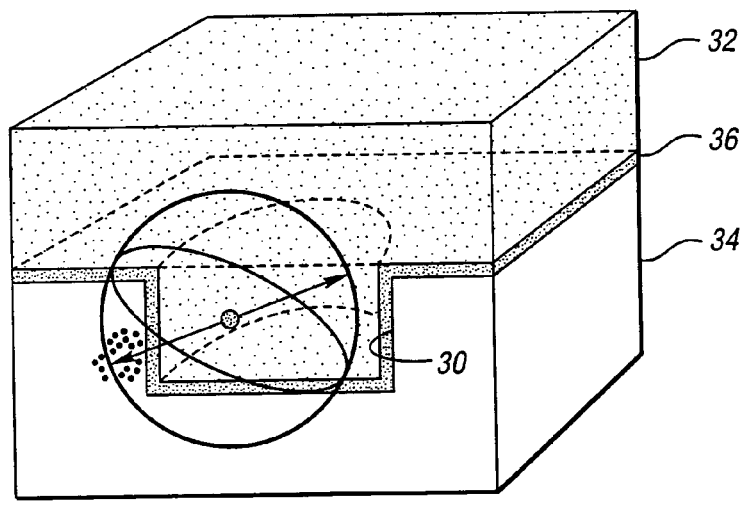
FIG. 3 is a perspective schematic view of a prior art detector which uses a depression filled with neutron reactive material in a semiconductor substrate to increase the neutron sensitivity of the device.

A comparison of measured results from a conventional boron-coated detector and a double-layered film detector, in which the device had a boron film deposited directly upon the detector, and a LiF film deposited upon the boron film shows that the device neutron-detection efficiency far exceeded that of the simple boron-coated device, and it far exceeded the theoretical maximum values of the simple coated device in FIG. 1.

Figure 5:
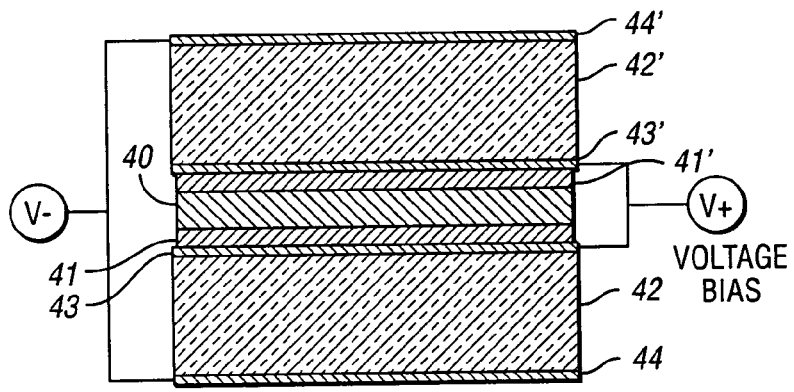
FIG. 5 is a side, sectional, schematic view of a double-inward stacked film detector of the invention showing the use of two different neutron-sensitive film coatings between two detectors.
Figure 6:
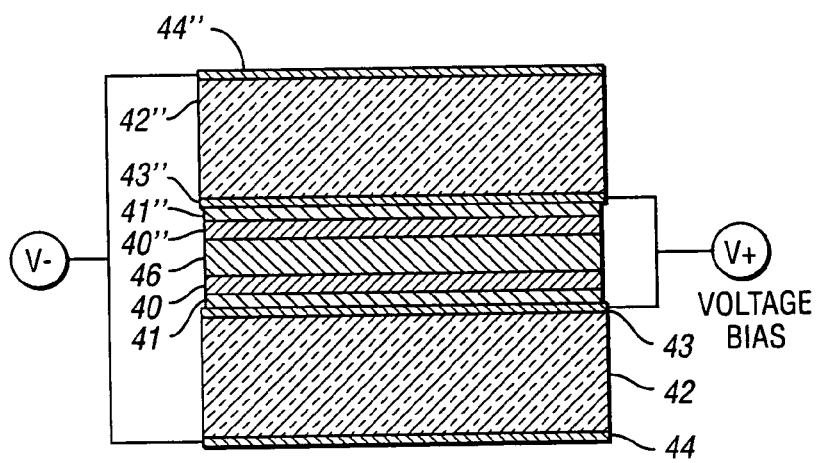
FIG. 6 is a side, sectional, schematic view of a double-inward multi-stacked detector of the invention showing that a series of various neutron-sensitive film coatings can be inserted between two detectors.

The layered film concept can be improved further by combining the double-layered film detectors of FIG. 4 in a double-inward facing sandwich design, as shown in FIG. 5 wherein the second detector has a prime designation for its components. Further improvements include multiple layered films upon a single device, again constructed in the double-inward facing sandwich design, as shown in FIG. 6 wherein the second detector has a double prime designation for its components. A third type of neutron reactive material is indicated by reference number 46.

FIG. 5 illustrates a double-layered, double-inward facing sandwich detector that incorporates the advantages of stacking the neutron-sensitive films. The neutron reactive films may include, but are not limited to, various compounds and concentrations of boron, lithium, lithium fluoride, gadolinium and cadmium. The device can have two or more different neutron reactive films placed between the semiconductor detectors. The semiconductor material may be composed of a variety of materials, including, but not limited to, silicon, silicon carbide, gallium arsenide, gallium nitride, indium phosphide, cadmium telluride, cadmium-zinc-telluride, gallium phosphide, mercuric iodide, lead iodide, and variations of these aforementioned semiconductors. Each semiconductor detector has conductive contacts, one contact placed upon a single semiconductor surface and another contact placed upon a second semiconductor surface of the same semiconductor material block, the second surface being generally parallel to the first surface. A voltage can be applied across each semiconductor block by means of the conductive contacts. A voltage may be applied separately to each semiconductor detector or may be applied together across both semiconductor detectors, as shown in FIG. 5 in the parallel configuration.

FIG. 6 illustrates a multi-layered, double-inward facing sandwich detector that incorporates the advantages of stacking the neutron sensitive films. The neutron reactive films may include, but are not limited to, various compounds and concentrations of boron, lithium, lithium fluoride, gadolinium and cadmium. The device can have two or more different neutron reactive films placed between the semiconductor devices. The semiconductor material may be composed of a variety of materials, including, but not limited to, silicon, silicon carbide, gallium arsenide, indium phosphide, cadmium telluride, cadmium-zinc-telluride, gallium phosphide, mercuric iodide, lead iodide, and variations of these aforementioned semiconductors. Each semiconductor detector has conductive contacts, one contact placed upon a single semiconductor surface and another contact placed upon a second semiconductor surface of the same semiconductor material block, the second surface being generally parallel to the first surface. A voltage can be applied across each semiconductor block by means of the conductive contacts. A voltage may be applied separately to each semiconductor detector or may be applied together across both semiconductor detectors, as shown in FIG. 6 in the parallel configuration.

The Double-Sided Porous Design

Improvements in dry etching methods with inductively coupled plasma systems, as described in references 12, 19 and 20, allow for precision holes to be etched completely through Si semiconductor wafers. The standard processes are developed and commercial systems are available for use, including systems within The University of Michigan MEMS Exchange collaboration.

Figure 7:
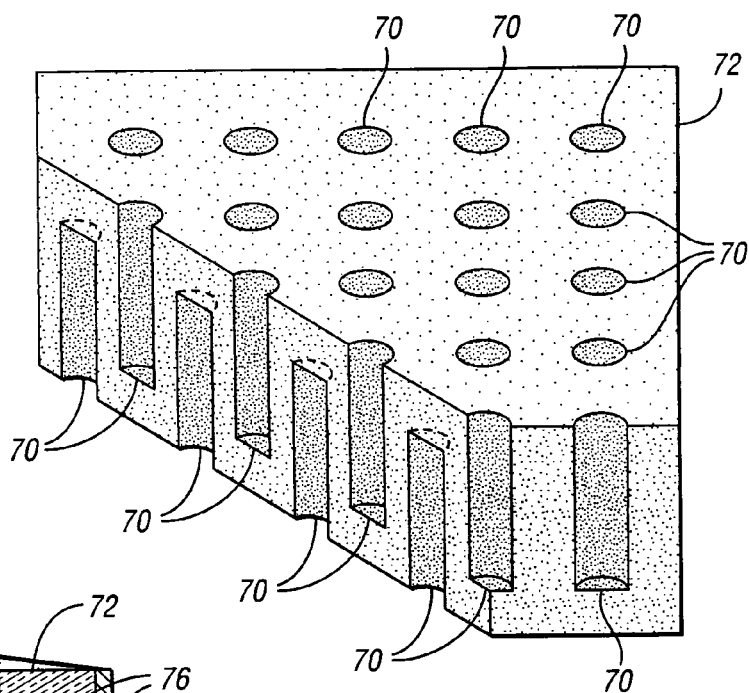
FIG. 7 is a perspective schematic view, partially broken away, of the double-sided porous design showing that deep holes can be etched into a semiconductor; the holes can be fashioned in one side of the substrate such that they are surrounded by holes from the opposite side of the substrate material; afterward, the holes may be filled with neutron reactive material.
Figure 8:
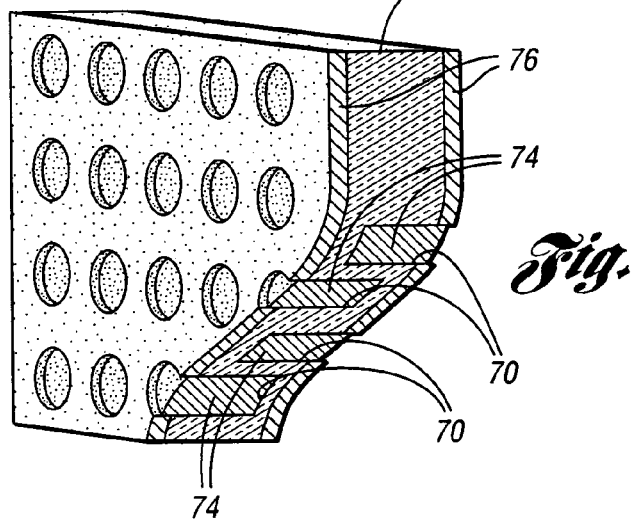
FIG. 8 is a perspective schematic view, partially broken away and in cross section, showing a double-sided porous design with deep holes etched from both sides; from the cut-away view, the tiny holes are filled with neutron reactive materials such as $^{10}B$ or $^{6}LiF$; the holes may be filled with different materials, such as $^{10}B$ on one side and $^{6}LiF$ on the other side.
Figure 9:
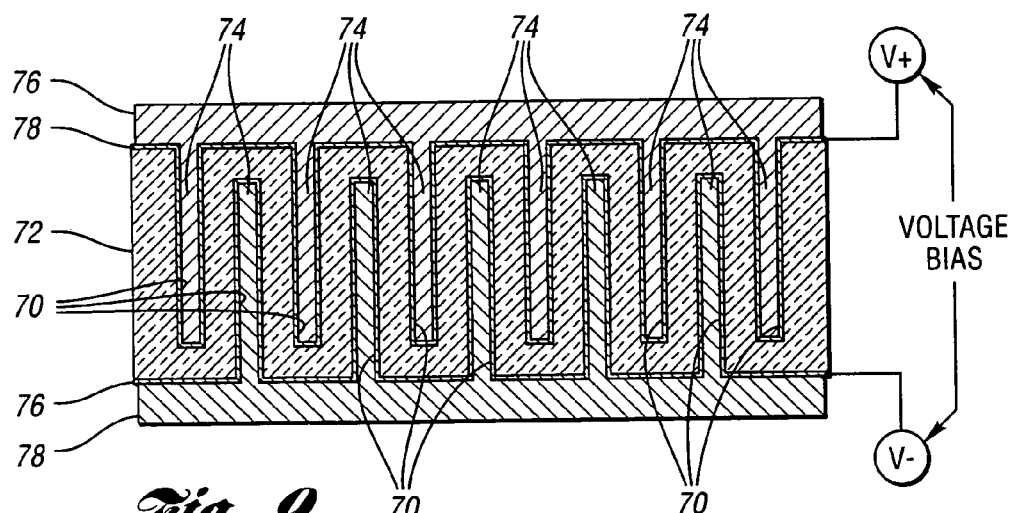
FIG. 9 is a side, sectional, schematic view of the double-sided porous design showing a possible configuration for the conductive electrode placement and the voltage application.

In another embodiment of the invention, holes 70 are etched from both the front and the back of semiconductor material 72 to produce an overall matrix or pattern, where holes 70 from one side are located between and are surrounded by holes 70 from the opposite side, as shown in FIG. 7. While the matrix may take any form, a hexagonal pattern produces better geometric packing. The holes 70 can be etched such that they do not reach all the way through the device. A p-n junction will be formed at the surface and in the holes of only one side of the device, thereby forming a diode. Afterward, both front and back holes 70 are filled with neutron reactive material 74 followed by a final coat 76 of neutron reactive material over the surfaces, as shown in FIGS. 8 and 9. FIG. 8 illustrates a cut-away view of a planar semiconductor block through which tiny holes have been etched from both sides. Neutron reactive substances have been deposited within the holes from both sides. The neutron reactive materials on each side may be the same or similar. The neutron reactive materials on either side may be of entirely different materials.

FIG. 9 illustrates a side view of a planar semiconductor block through which tiny holes have been etched from both sides. Neutron reactive substances have been deposited within the holes from both sides. The neutron reactive materials on either side may be of entirely different materials. The conductive contacts 78 for the device are fabricated on opposite surfaces and within the holes. Voltage can be applied across the opposite conductive contacts.

Figure 10:
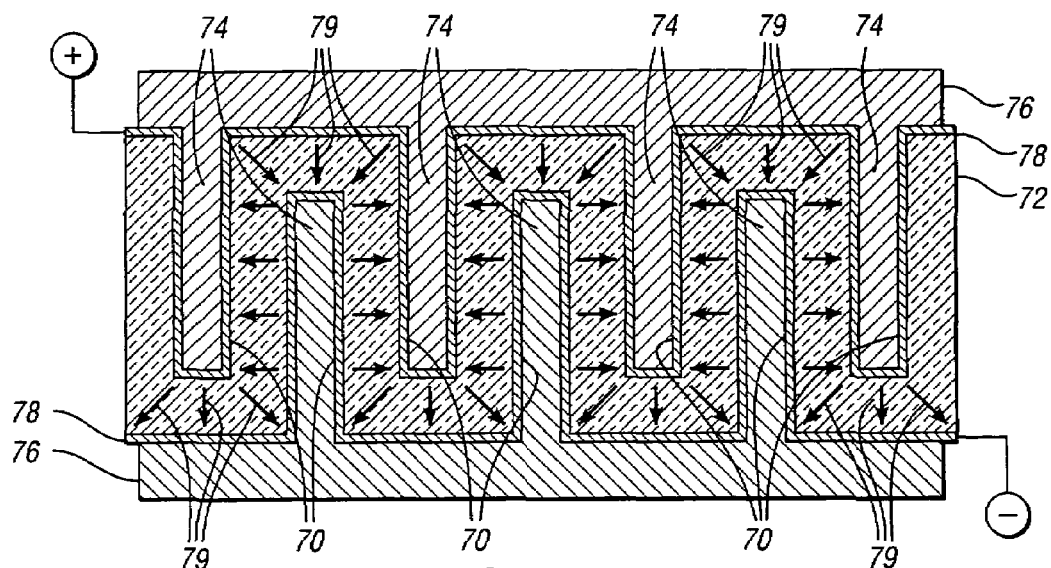
FIG. 10 is a side, sectional, schematic view of the double-sided porous design showing the direction of the electric field lines for the electrode configuration of FIG. 9; a conductive layer is applied to both sides, such as through doping or evaporation, such that it forms a diode; an applied bias causes the field lines to run perpendicular to the holes thereby increasing the active surface adjacent to the reactive film.

FIG. 10 depicts a cross section view of the concept, in which it is shown that the electric field will extend across the small regions between the holes and not just the parallel faces of the wafer. A single device utilizing either $^{10}$B or $^{6}$LiF can achieve thermal neutron-detection efficiencies greater than 25%, reaching over 50% for a sandwich design. Furthermore, with high purity silicon as the semiconductor base, the voltage (and power) requirement to operate the detector will be under 100 volts, since the active width resides between the holes and not just the front and back of the wafers When using n-type silicon material, a p-n junction contact can be formed by several methods, all of which will be explored herein, thereby establishing a most reliable fabrication process.

As previously mentioned, FIG. 10 illustrates a side view of the planar semiconductor block from FIG. 9, through which tiny holes have been etched from both sides. Neutron reactive substances have been deposited within the holes from both sides. The neutron reactive materials on each side may be the same or similar. The neutron reactive materials on either side may be of entirely different materials. The conductive contacts for the device are fabricated on opposite surfaces and within the holes. With voltage applied across the detector, the electric field lines 79 are perpendicular to the etched holes.

For instance, methods by which the contacts can be formed include:

Traditional Diffusion Method. Hole etched wafers are arranged in a quartz (or SiC) boat on edge with boron nitride solid wafer sources in between each wafer. The boat is then inserted into a high-temperature furnace and heated to 1150° C. A carrier gas (such as nitrogen) flows into the furnace and carries boron atoms to the surface of the silicon wafers, which then diffuses into the semiconductor surface to form a p-n junction. If the holes are very deep, then stagnation with the nitrogen flow may cause some difficulty with doping deep in the holes.

Dry Powder and Gas Method. One side of the hole etched wafer is lightly coated with $^{10}$B material with an evaporator as shown in reference 18. The wafer is aligned such that boron enters and coats the hole walls of one side of the wafer only. Afterward, $^{10}$B powder is inserted into the holes as previously described such that they are filled. The wafers are then inserted into a high temperature furnace with typical diffusion gases (such as nitrogen) and heated to 1150° C. for approximately 30 minutes. The thermal treatment causes boron, a p-type dopant in silicon, to diffuse into the n-type material thereby forming a p-n junction.

Implantation Method. Hole etched wafers are sent to a typical ion implantation company where boron ions are implanted directly into the holes. The process requires careful alignment of the wafers such that the holes are parallel with the ion beam. Rotation of the wafers during implantation improves uniformity. Afterward, the wafers are annealed such that the implanted boron atoms are activated, which form the p-n junction.

One drawback of the design is the possibility of a high capacitance from the increased surface area and decreased effective electrode width. Hence, the spacing between the holes could be optimized not only to increase the neutron-detection efficiency, but to also decrease the device capacitive noise. An alternative approach that will render good neutron-detection efficiency while retaining low capacitance is shown in FIG. 13. Here it is shown that holes 80 are etched as depicted in FIGS. 7 and 8.

As shown in FIG. 14, under operation the electric field lines 88 run parallel to the holes 80 and the capacitance is now determined by the substrate width and not the hole spacing. The only drawback is that the depletion region of the device must extend across most of the detector bulk. FIG. 14 illustrates a side view of the planar semiconductor block from FIG. 13, through which tiny holes 80 have been etched from both sides. Neutron reactive substances 86 have been deposited within the holes from both sides. The neutron reactive materials on each side may be the same or similar. The neutron reactive materials on either side may be of entirely different materials. The conductive contacts 82 for the device are fabricated on opposite surfaces and are not fabricated within the tiny holes 80. With voltage applied across the detector, the electric field lines 88 are perpendicular to the planar semiconductor detector surfaces.

Utilization of pure $^6$Li material for the neutron converter will yield the highest efficiency results, and estimates indicate that thermal neutron-detection efficiencies for a single device can exceed 30%. A sandwich device should easily exceed 60% thermal neutron-detection efficiency. Pure Li metal is highly reactive and decomposes easily, hence a durable encapsulation method is required. Furthermore, inserting pure Li into the holes is not as easy as with boron or LiF powders. Lithium metal is very malleable with a low melting point (180° C.); hence the material can be applied to the semiconductor surface and melted into the holes. Also highly diffusive, a durable diffusion barrier must be applied to the semiconductor before the lithium treatment. The process can be performed in an inert gas thereby preventing decomposition of the Li during the treatment. Afterward, a thick overcoat of encapsulant, such as zirconium, is evaporated over the entire device (front and back) so as to prevent decomposition of the lithium metal.

The High-Efficiency Integrated Designs

Integrating the efficiency enhancing features described in the earlier sections results in a remarkable device capable of exceeding 35% thermal neutron-detection efficiency for a device only 1 mm thick. FIGS. 11*a*, 11*b*, 12 and 15 show the basic concepts.

Figure 11A:
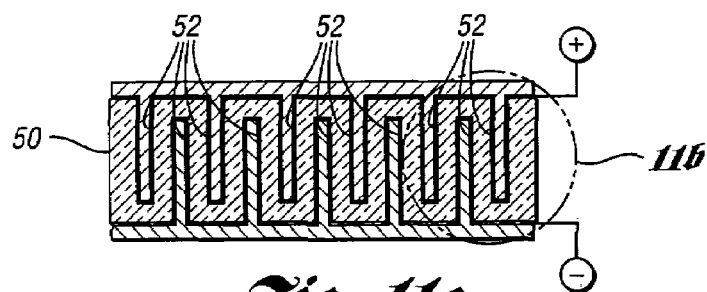
FIG. 11a is a side, sectional, schematic view of the double-sided porous design with a multi-stacked compound film.
Figure 11B:
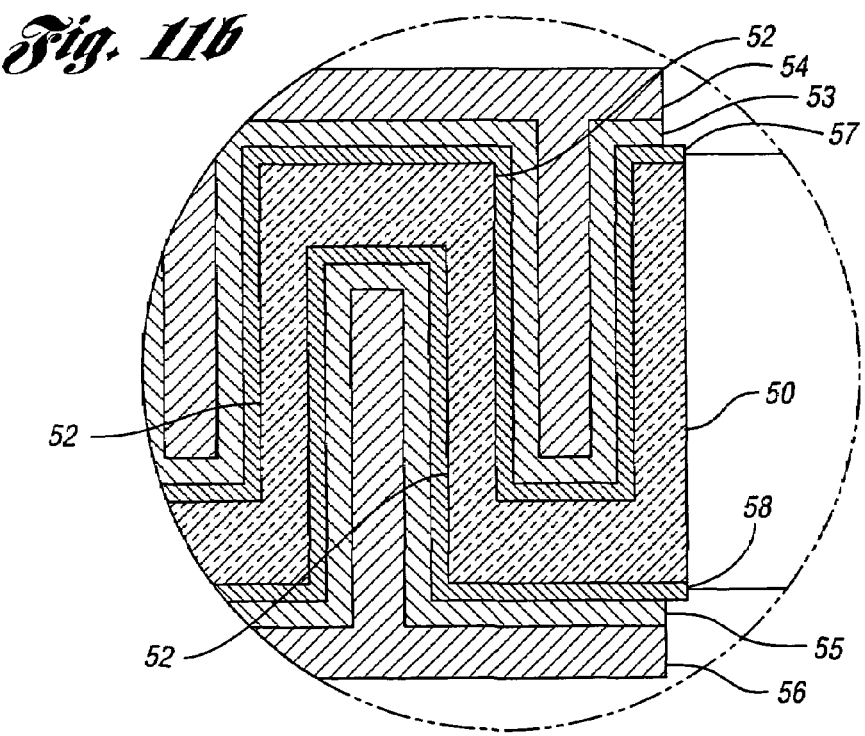

FIGS. 11*a* and 11*b* illustrate side views of a planar semiconductor block 50 through which tiny holes 52 have been etched from both sides. FIG. 11*b* is an enlarged view of a section of the detector profile. Multi-layered neutron reactive substances have been deposited within the holes 52 from both sides. The neutron reactive materials on each side may consist of two or more layers 53, 54, 55 and 56. The neutron reactive film layering on either side may be similar. The neutron reactive film layering on either side may be of different materials or sequence of materials. The conductive contacts 57 and 58 for the device are fabricated on opposite surfaces and within the holes 52. Voltage can be applied across the opposite conductive contacts 58.

FIG. 12 illustrates a sandwich detector design utilizing two detectors described in FIG. 9. The sandwich detectors may, alternatively, consist of detectors as illustrated in FIGS. 11*a* and 11*b*.

Figure 15:
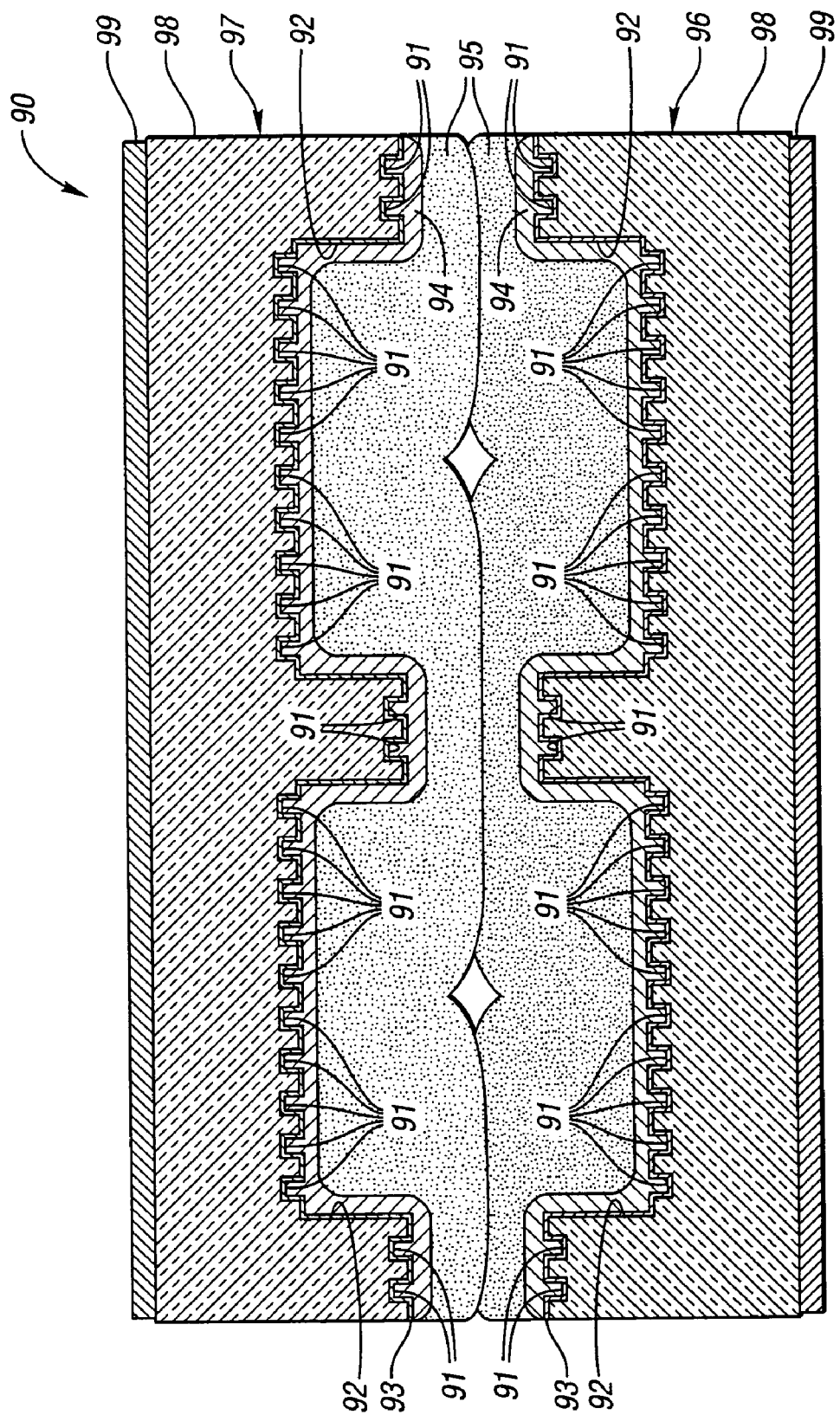
FIG. 15 is a conceptual side sectional view of an integrated sandwich/double-layered/perforated neutron detector; shown is a composite utilizing multi-layered neutron reactive films, filled holes of various sizes, attached together in the sandwich design.

FIG. 15 illustrates a side view of a compound semiconductor neutron detector, generally indicated at 90. The compound detector 90 has more than one diameter size of hole, within which the small holes 91 are etched over the entire surface including the large holes 92. Conductive contacts 93 are placed over the etched surfaces to fill the small and large holes 91 and 92, respectively, over which multiple layers 94 and 95 of neutron reactive materials are placed to fill the small and large holes 91 and 92, respectively. The etched and coated semiconductor devices 96 and 97 are arranged in a double-inward sandwich design.

In one possible design, as shown in FIG. 15, the semiconductor substrate 98, such as Si, SiC, GaAs or GaN is etched such that miniature holes 91 (approximately 3.5 microns in diameter) cover the devices 96 and 97. Additionally, larger diameter holes 92 cover the devices 96 and 97 and some of the smaller holes 91 are within the larger holes 92. The devices 96 and 97 are coated with conductive layers 93 and 99, such as Au, Pd, Pt, Ti and combinations, mixtures and alloys thereof, easily accomplished with either evaporative or sputter deposition, over which a first layer 94 of $^{10}$B is deposited. $^{10}$B material is subsequently deposited into the small holes with ultrasonic vibration. Afterward, a thicker layer 95 of pure $^6$Li is deposited over the devices 96 and 97 such that it fills the larger holes 92. The devices 96 and 97 are then pressed together such that they face each other. The end result is a remarkably efficient and compact neutron detector 90 that can yield over 35% thermal neutron-detection efficiency for a device no thicker than 1 mm.

All of the devices in the previous sections can be formed into thermal neutron imaging arrays. Since VLSI technology is used to form the detectors, it is a straightforward extension to fabricate arrays of any or all of the devices discussed.

Preliminary experiments demonstrated a 10% increase in efficiency when 10.6% of a device surface was covered with 5.0-micron deep holes, all filled with $^{10}$B, which increased the thermal neutron-detection efficiency from 3.0% up to 3.3%, as described in reference 18. Based on the results, calculations indicate that 10-micron deep holes covering 40% of the surface area yields a thermal neutron efficiency of 6.4%, yielding a 194% increase in efficiency. Powder filling is a less efficient method of introducing boron into the tiny holes than thin film methods such as sputtering, hence the density of material can be increased which will further increase the detection efficiency. The efficiency can be increased even higher by increasing the hole depth, leading to more neutron absorption interactions in which more charged particle reaction products can enter into the tiny hole walls. It is possible to achieve thermal neutron efficiencies greater than 12% with the configuration, a remarkable efficiency for a radiation hard device that is only a few hundred microns in total thickness.

A substrate-chilled evaporation technique has been developed to deposit thin films of $^{10}$B onto devices with successful results. Evaporated boron thin films have high stress, and films exceeding one micron in thickness usually delaminate and peel away from the device. Tiny holes patterned over the semiconductor surface relieve the stress, thereby making very thick films easy to manufacture by eliminating the delamination problem. The holes can be filled by a variety of methods, including evaporation deposition, sputter deposition, and ultrasonic vibration of fine powders into the holes. Two techniques to fill the holes with neutron reactive material have been demonstrated with success. The first method involves the use of electron-beam evaporator in which the boron or LiF material is directly deposited into the holes and over the device surface. For holes deeper than 10 microns, powder filling has proven to be effective. The process involves the use of submicron $^{10}$B powder (particle size distributions ranging from 0.5 microns to 1.8 microns can be purchased through commercial vendors). The boron powder is spread over the device and ultrasonically vibrated into the tiny holes.

The technology presently used to etch the GaAs wafers incorporates reactive ion etching (RIE) in which chemical etchant ions are accelerated toward the semiconductor surface. The method uses capacitive coupling and has proven to work, but is a slow process with rates of only one micron per hour for a standard etch process. Capacitive-coupled RIE is slow to etch due to the limitation in power that can be applied. Newer methods incorporating inductively coupled plasmas (ICP) allow for cooler temperatures, higher operating voltages, higher electron densities, and much higher etching rates than capacitive-coupled RIE.

Although Si seems an obvious choice for the neutron detectors, other semiconductors have advantages as well. For instance, the "stopping power" of Si is less than GaAs, hence the charged particle reaction products can be absorbed in a smaller region with GaAs than with Si. For instance, a 1.5 MeV alpha particle is fully absorbed within 5.8 microns of Si, but only 4.2 microns of GaAs. Since it is the material between the holes that absorbs the reaction product energy, a much denser matrix of holes can be formed in a GaAs substrate than a Si substrate. The end result is a higher overall neutron-detection efficiency for GaAs than with Si. Yet, the gamma ray background noise will be higher for GaAs than for Si, hence the designs for either Si devices or GaAs devices must be optimized for the detection application.

Either Si or GaAs can be used for general-purpose neutron detectors, but both have a radiation hardness limit of $10^{12}$ n/cm$^2$ before degradation becomes noticeable. SiC, however, has been shown to more radiation had than GaAs or Si, as described in reference 6, and it is far less sensitive to gamma ray background noise. Furthermore, with its band gap energy of 3.0 eV, SiC can be used as a neutron detector in elevated temperature environments, as also described in reference 6.

Figure 16:
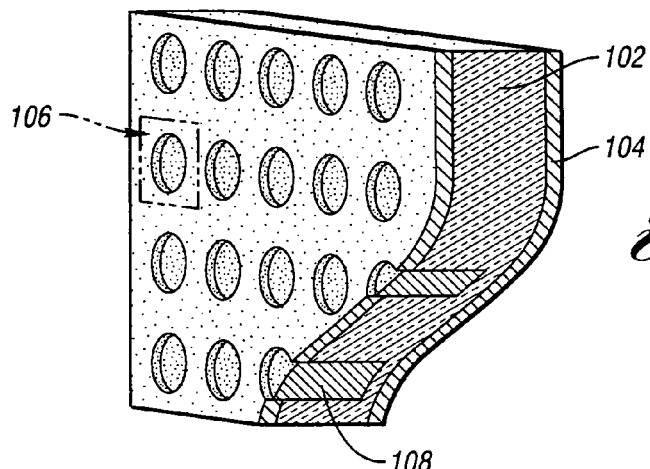
FIG. 16 is a perspective schematic view, partially broken away and in cross-section, of a detector in which deep holes are etched and filled with a neutron reactive material.

FIG. 16 is a cut-away view of a perforated semiconductor neutron detector in which deep holes 108 are etched into a surface of the semiconductor material 102 and filled with neutron reactive material (114 in FIG. 16) such as $^{10}$B or $^6$LiF. A back contact is indicated at 104. The periodic structure of the holes 108 allows for analysis of a single unit cell 106, as shown by the doted line surrounding a single hole that has been filled with the neutron reactive material 114. The cell 106 is a square, hence all four sides of the cell 106 as shown have the same length.

Figure 17:
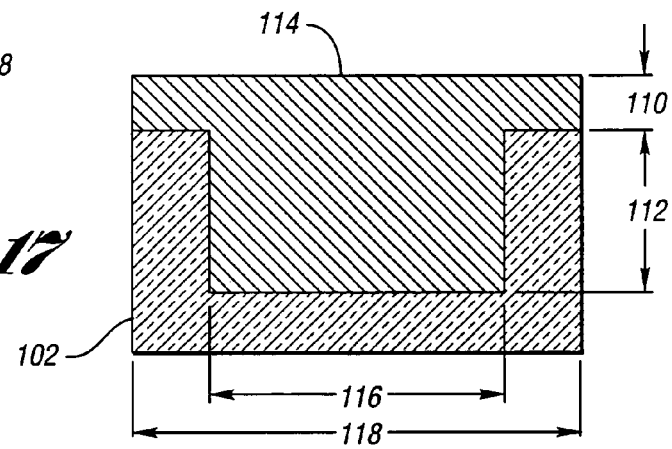
FIG. 17 is a side view of a unit cell of FIG. 16.

FIG. 17 is a side view of the unit cell 106 of FIG. 16 wherein the neutron reactive material 114 fills a hole having a diameter 116 and a depth 112 in the semiconductor 102. A cap of the material 114 has a depth 110. Cell length and width is indicated at 118. For a LiF-filled detector with circular holes 300 microns deep and with a cell of 50 microns×50 microns, a hole diameter of 30 microns and no cap layer, the efficiency is approximately 17.5%. With a 10 or 20 micron cap layer, the efficiency increases to 20.5%. This is for frontal irradiation.

For backside irradiation, with a cell of 50 microns×50 microns, a hole diameter of 30 microns and no cap layer, the efficiency is approximately 19.5%. With a 30 micron cap layer, the efficiency increases to 22.5%.

Figure 18:
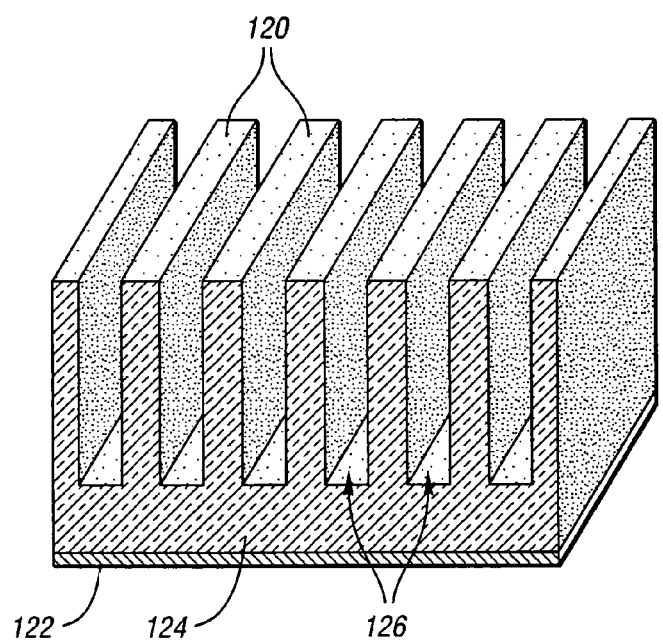
FIG. 18 is a perspective schematic view of a semiconductor having etched slots or trenches.

FIG. 18 shows slots or trenches 126 etched into the top surface of semiconductor material 124 in the same manner that holes can be etched into the semiconductor surface. Upper and lower contacts 120 and 122, respectively, are also provided.

Figure 19:
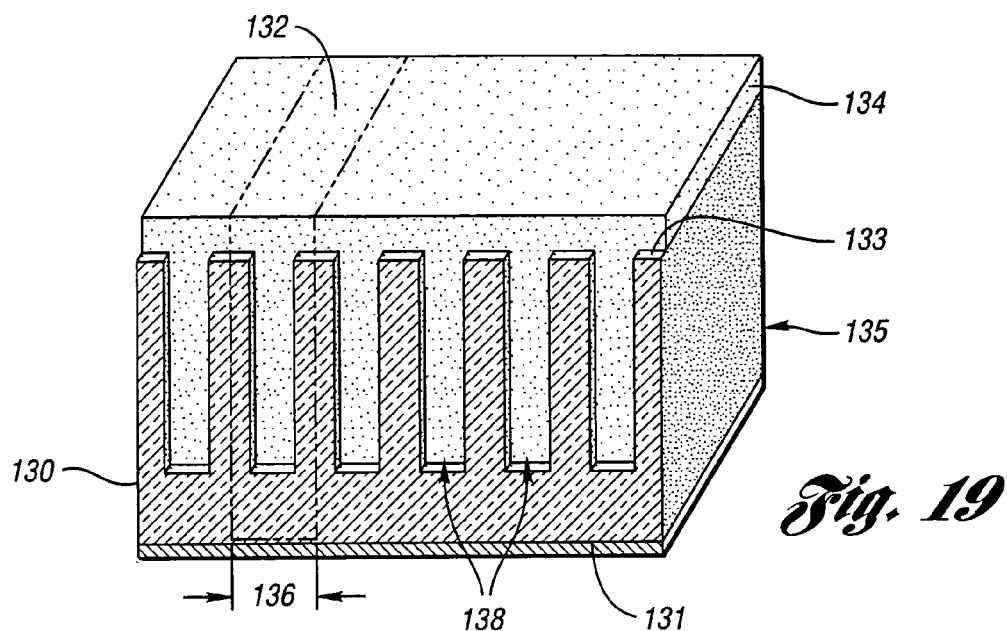
FIG. 19 is a perspective schematic view of a trenched detector having deep trenches filled with a neutron reactive material.
Figure 20:
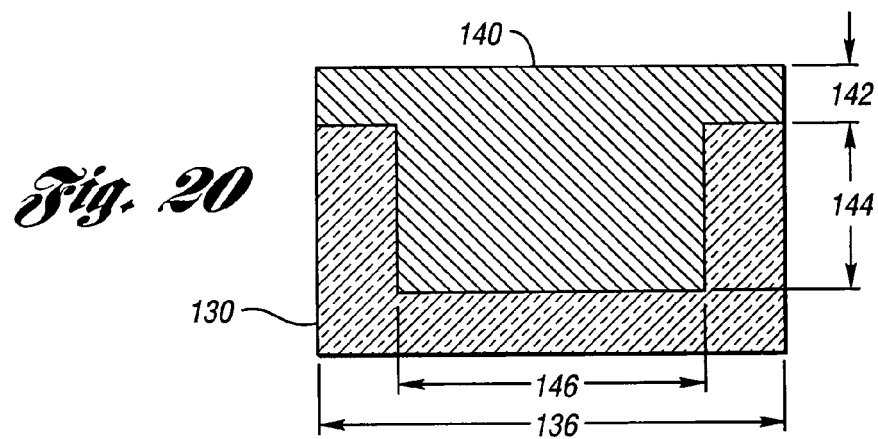
FIG. 20 is a side view of a unit cell of FIG. 19.

FIGS. 19 and 20 show a trenched or slotted semiconductor neutron detector, generally indicated at 135, in which deep trenches 138 are etched into the surface of semiconductor material 130 and filled with neutron reactive material 140 such as $^{10}$B or $^6$LiF. The periodic structure of the trenches 138 allows for analysis of a single unit cell 132, as shown by the dotted line surrounding outlining a single slot 138 that has been filled with the neutron reactive material 140. The lateral dimension 136 of the cell 132 perpendicular to the slots 138 is used as the reference. A cap layer 134 is formed at the top surface and a contact 131 at the bottom surface. FIG. 20 is a side view of the unit cell 132 wherein cap depth is indicated at 142, trench width at 146, cell width at 136 and trench depth at 144. For example, for frontal radiation, with a cell of 50 microns wide, a trench width of 25 microns and no cap layer, the efficiency is approximately 24.5%. With a 10 micron cap layer, the efficiency slightly increases to 25%.

For backside radiation, with a cell of 50 microns wide, a trench width of 25 microns and no cap layer, the efficiency is approximately 25.5%. With a 20 micron cap layer, the efficiency increases to 27%. Backside irradiation allows for slightly higher efficiency than frontal irradiation.

Figure 21:
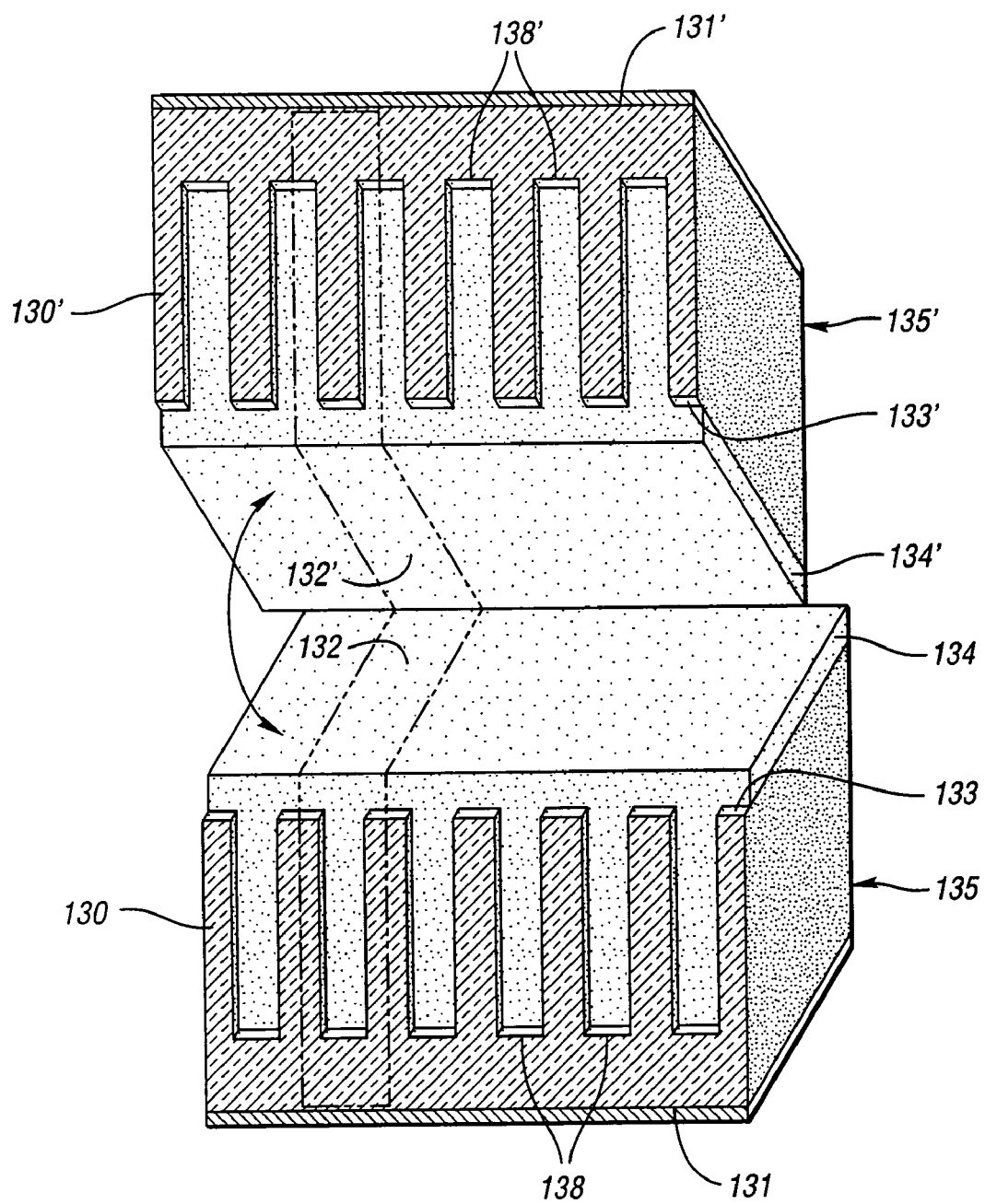
FIG. 21 is a perspective schematic view showing the fastening of two trenched devices to obtain a sandwich design of FIG. 22.
Figure 22:
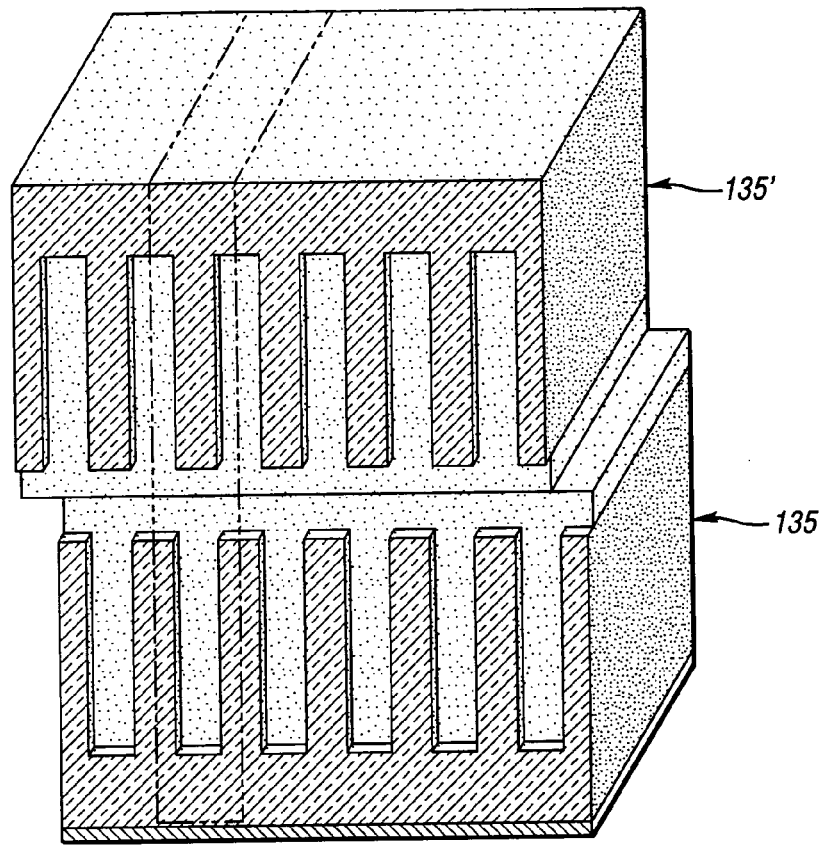
FIG. 22 is a perspective schematic view of a sandwich design wherein semiconductor walls or "fingers" on a first device are arranged to align with slots of another device facing the first device.

FIGS. 21 and 22 show a sandwich design of two detectors 135 and 135' wherein the detector 135' is substantially identical to the detector 135, as indicated by the prime designation. The resulting device efficiency is further increased by the sandwich design in which the two trench devices 135 and 135' are fastened facing each other.

Semiconductor "fingers" on one device 135' are arranged to align with the slots of the other device 135 facing it, as shown in FIG. 22. In other words, to optimize neutron absorption, the semiconductor fingers from one device 135' can be placed over the trenches of the other device 135.

Figure 23:
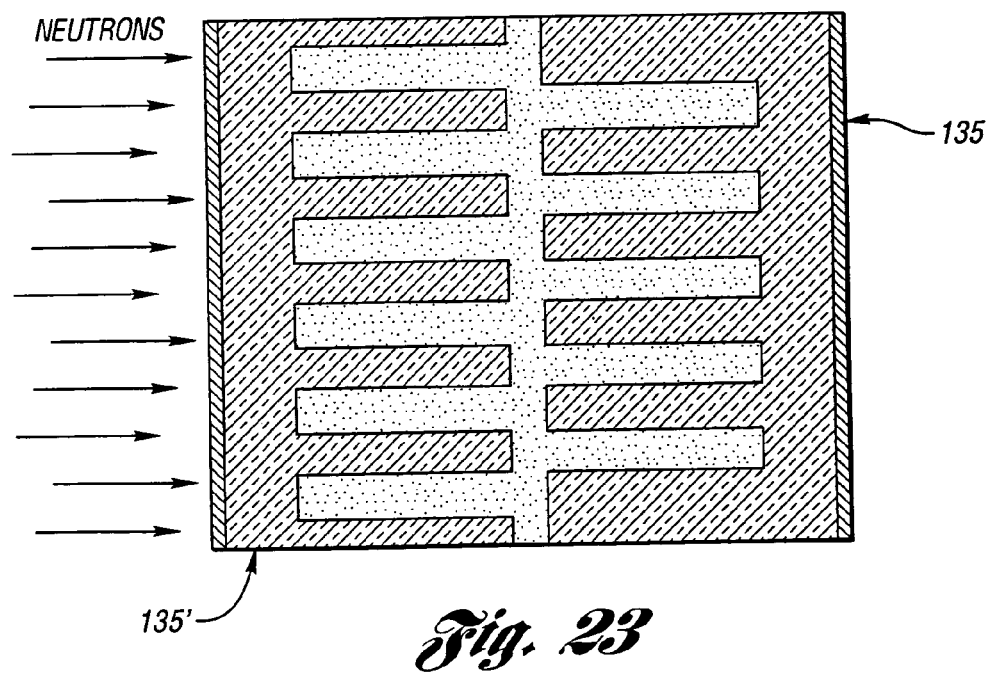
FIG. 23 is a side view of the sandwich design of FIG. 22.

FIG. 23 shows oppositely facing devices 135 and 135' in which the fingers of one device align with the trenches of another device. This allows for neutron reactive material to completely obscure the path of neutrons impinging perpendicular to the device planes. The expected thermal neutron intrinsic detection efficiency can be increased above 50% for the sandwich design depicted in FIG. 23.

Figure 24:
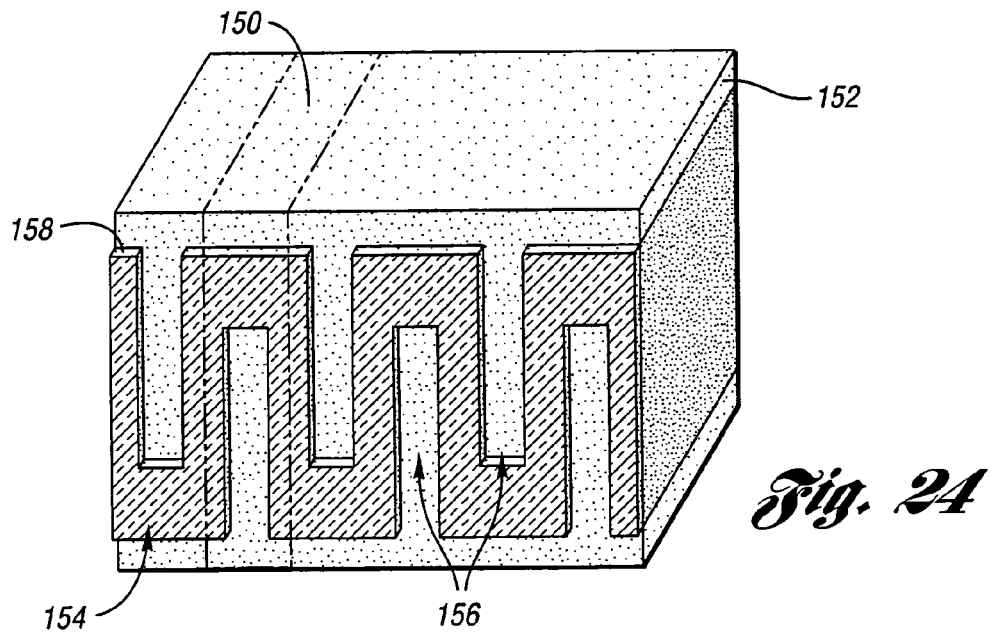
FIG. 24 is a perspective schematic view, similar to the double-sided hole design of FIG. 9, of a trench design with interwoven trenches.

Similar to the previously described double-sided hole design, a trench design of FIG. 24 has interwoven trenches 156 etched into a semiconductor 154 from both top and bottom surfaces. A unit cell 150 is shown as well as a cap layer 152 and a contact 158 as before.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Apparatus for efficiently detecting neutrons, the apparatus comprising:
   a particle-detecting first substrate having first and second surfaces spaced apart by a region of the substrate and a plurality of cavities extending into the substrate from the first and second surfaces; and
   neutron-responsive material disposed in the plurality of cavities, the material being responsive to neutrons absorbed thereby for releasing ionizing radiation reaction products, wherein the neutron-responsive material disposed in the cavities at the first and second surfaces increases neutron-detection efficiency by increasing the likelihood that the reaction products will be directed into the substrate for increased neutron-detection efficiency.

2. The apparatus as claimed in claim 1, further comprising a first contact layer disposed on the first surface; and
   a second contact layer disposed on the second surface.

3. The apparatus as claimed in claim 2, wherein the first and second contact layers are also disposed in the plurality of cavities.

4. The apparatus as claimed in claim 1, wherein the plurality of cavities include etched via holes.

5. The apparatus as claimed in claim 1, wherein the plurality of cavities include etched trenches or slots.

6. The apparatus as claimed in claim 1, wherein the neutron-responsive material is also disposed as at least one cap layer on the first and second surfaces.

7. The apparatus as claimed in claim 1, wherein the neutron-responsive material disposed in the cavities at the first surface is of a first type different from a second type of neutron-responsive material disposed in the cavities at the second surface.

8. The apparatus as claimed in claim 1, wherein the neutrons are thermal neutrons.

9. The apparatus as claimed in claim 1, wherein the cavities extending into the substrate from one of the surfaces are surrounded by cavities extending into the substrate from the other of the surfaces.

10. The apparatus as claimed in claim 1, wherein the first substrate is composed primarily of a semiconductor material.

11. The apparatus as claimed in claim 10, wherein the semiconductor material is silicon, silicon carbide, gallium arsenide, gallium nitride, indium phosphide, cadmium telluride, cadmium-zinc-telluride, gallium phosphide, mercuric iodide, or lead iodide.

12. The apparatus as claimed in claim 1 further comprising a particle-detecting second substrate having neutron-responsive material disposed in cavities of the second substrate and stacked on the first substrate.

13. The apparatus as claimed in claim 12, wherein the neutron-responsive material is also disposed as layers between the substrates.

14. The apparatus as claimed in claim 1, wherein different types of neutron-responsive material are disposed in each of the plurality of cavities.

15. The apparatus as claimed in claim 14, wherein the neutron-responsive material is also disposed as a plurality of layers of different types of neutron-responsive material on both the first and second surfaces.

16. Apparatus for efficiently detecting neutrons, the apparatus comprising:
a particle-detecting first substrate having first and second surfaces spaced apart by a region of the substrate;
a first contact layer disposed on the first surface of the substrate;
a second contract layer disposed on the second surface of the substrate; and
a first stack of neutron-responsive layers, including a first layer of neutron-responsive material of a first type disposed on the first contact layer and a second layer of neutron-responsive material of a second type different from the first type disposed on the first layer, both of the materials being responsive to neutrons absorbed thereby for releasing ionizing radiation reactive products.

17. The apparatus as claimed in claim 16, wherein the first layer has a higher neutron interaction cross section than the second layer.

18. The apparatus as claimed in claim 16, wherein the first and second types of material include elemental or compound forms of lithium, lithium fluoride, boron, gadolinium, plastic, cadmium, $U^{235}$, Pu and Th.

19. The apparatus as claimed in claim 16, wherein the first substrate is composed primarily of a semiconductor material.

20. The apparatus as claimed in claim 19, wherein the semiconductor material is silicon, silicon carbide, gallium arsenide, indium phosphide, cadmium telluride, cadmium-zinc-telluride, gallium phosphide, mercuric iodide, or lead iodide.

21. The apparatus as claimed in claim 16 further comprising a particle-detecting second substrate having at least one neutron-responsive layer disposed on a contact layer of the second substrate and stacked on the first substrate.

22. The apparatus as claimed in claim 21, wherein the layers of neutron-responsive material are disposed between the substrates.

23. The apparatus as claimed in claim 16 further comprising a stack of neutron-responsive layers disposed on the second contact layer.

24. Apparatus for efficiently detecting neutrons, the apparatus comprising:
a particle-detecting first substrate having spaced first and second surfaces and a plurality of different-sized cavities extending into the substrate from the first and second surfaces; and
neutron-responsive material disposed in the plurality of different-sized cavities, the material being responsive to neutrons absorbed thereby for releasing ionizing radiation reaction products, wherein the neutron-responsive material disposed in the different-sized cavities at the first and second surfaces increases neutron-detection efficiency by increasing the likelihood that the reaction products will be directed into the substrate for increased neutron-detection efficiency.

25. The apparatus as claimed in claim 24, further comprising a first contact layer disposed on the first and second surfaces; and
a second contact layer disposed on a third surface of the substrate spaced apart from the first and second surfaces by a region of the substrate.

26. The apparatus as claimed in claim 25, wherein the first contact layer is also disposed in the plurality of cavities.

27. The apparatus as claimed in claim 24, wherein the plurality of cavities include etched large and small via holes.

28. The apparatus as claimed in claim 24, wherein the neutron-responsive material is also disposed as a layer on the first and second surfaces.

29. The apparatus as claimed in claim 24, wherein the neutron-responsive material disposed in the cavities at the first surface is of a first type different from a second type of neutron-responsive material disposed in the cavities at the second surface.

30. The apparatus as claimed in claim 24, wherein the neutrons are thermal neutrons.

31. The apparatus as claimed in claim 24, wherein the cavities are generally circular in cross section.

32. The apparatus as claimed in claim 24, wherein the neutron-responsive material includes elemental or compound forms of lithium, lithium fluoride, boron, gadolinium, cadmium, any form of plastic, $U^{235}$, Pu or Th.

33. The apparatus as claimed in claim 24, wherein the first substrate is composed primarily of a semiconductor material.

34. The apparatus as claimed in claim 33, wherein the semiconductor material is silicon, silicon carbide, gallium arsenide, gallium nitride, indium phosphide, cadmium telluride, cadmium-zinc-telluride, gallium phosphide, mercuric iodide, or lead iodide.

35. The apparatus as claimed in claim 24, wherein relatively small cavities extending into the first substrate from one of the surfaces are disposed within relatively large cavities extending into the first substrate from the other surface.

36. The apparatus as claimed in claim 24 further comprising a particle-detecting second substrate having neutron-responsive material disposed in a plurality of different-sized cavities in the second substrate and stacked on the first substrate.

37. The apparatus as claimed in claim 36, wherein the neutron-responsive material is disposed as layers between the substrates.

38. The apparatus as claimed in claim 37, wherein at least two of the layers are of different neutron-responsive material.

39. Apparatus for efficiently detecting neutrons, the apparatus comprising:
  a particle-detecting first substrate having first and second surfaces spaced apart by a first region of the first substrate and a first set of cavities extending into the first substrate from the first surface;
  a particle-detecting second substrate stacked on the first substrate and having first and second surfaces spaced apart by a second region of the second substrate and a second set of cavities extending into the second substrate from the first surface of the second substrate; and
  neutron-responsive material disposed in the first and second sets of cavities and on the first surfaces of the substrates, the material being responsive to neutrons absorbed thereby for releasing ionizing radiation reaction products, wherein the neutron-responsive material disposed in the first and second sets of cavities increases neutron-detection efficiency by increasing the likelihood that the reaction products will be directed into the first and second substrates, respectively, for increased neutron-detection efficiency.

40. The apparatus as claimed in claim 39, wherein the first and second sets of cavities are not aligned to further optimize neutron absorption.

41. The apparatus as claimed in claim 39 further comprising a first contact layer disposed on the second surface of the first substrate and a second contact layer disposed on the second surface of the second substrate.

42. A method of making a high-efficiency neutron detector, the method comprising:
  providing a particle-detecting substrate having a first surface and a plurality of cavities extending into the substrate from the first surface;
  filling the plurality of cavities with a neutron-responsive material; and
  forming a thick film of the neutron-responsive material over the first surface including the plurality of cavities wherein the cavities relieve stress in the thick film to prevent delamination of the thick film from the first surface, the material being responsive to neutrons absorbed thereby for releasing ionizing radiation reaction products, wherein the neutron-responsive material disposed in the cavities at the first surface increases neutron-detection efficiency by increasing the likelihood that the reaction products will be directed into the substrate for increased neutron-detection efficiency.

43. The method as claimed in claim 42, wherein the thick film exceeds one micron in thickness.

44. A method of making a high-efficiency neutron detector, the method including providing a particle-detecting first substrate having a first surface and a plurality of cavities extending into the substrate from the first surface, and filling the plurality of cavities with a neutron-responsive material, the material being responsive to neutrons absorbed thereby for releasing ionizing radiation reaction products, wherein the neutron-responsive material disposed in the cavities at the first surface increases neutron-detection efficiency by increasing the likelihood that the reaction products will be directed into the substrate for increased neutron-detection efficiency, the improvement comprising:
  the step of filling includes the step of spreading the material on the first surface and vibrating the material into the plurality of cavities.

45. The method as claimed in claim 44, wherein the material is submicron powder.

* * * * *